(12) United States Patent
Yamakawa et al.

(10) Patent No.: US 6,236,051 B1
(45) Date of Patent: May 22, 2001

(54) SEMICONDUCTOR RADIATION DETECTOR

(75) Inventors: Tsutomu Yamakawa, Tochigi-ken; Takashi Ichihara, Otawara, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/277,162

(22) Filed: Mar. 26, 1999

(30) Foreign Application Priority Data

| Mar. 27, 1998 | (JP) | 10-081843 |
| May 29, 1998 | (JP) | 10-148802 |
| May 29, 1998 | (JP) | 10-149207 |
| Jun. 2, 1998 | (JP) | 10-152960 |

(51) Int. Cl.$^7$ ........................... G01T 1/24
(52) U.S. Cl. ................. 250/370.1; 250/370.09; 250/370.01
(58) Field of Search .............. 250/370.1, 370.07, 250/370.09, 363.02, 206.1

(56) References Cited

U.S. PATENT DOCUMENTS

| 4,879,464 | * | 11/1989 | Iinuma | 250/363.02 |
| 4,931,648 | * | 6/1990 | Elliott et al. | 250/370.1 |
| 5,434,417 | * | 7/1995 | Nygren | 250/370.01 |
| 5,585,638 | * | 12/1996 | Hoffman | 250/370.07 |
| 5,753,921 | * | 5/1998 | Trauernicht et al. | 250/370.09 |
| 5,786,597 | | 7/1998 | Lingren et al. | |

FOREIGN PATENT DOCUMENTS

| 63-182869 | 7/1988 | (JP) . |
| 63-182870 | 7/1988 | (JP) . |

OTHER PUBLICATIONS

Nucl. Instr. Meth., 3 Pages, "Heart Imaging by Cadmium Telluride Gamma–Camera(*)", Eurorad + Biomed Consortium, 1999 Abstract.

* cited by examiner

*Primary Examiner*—Constantine Hannaher
*Assistant Examiner*—Otilia Gabor
(74) *Attorney, Agent, or Firm*—Oblon, Spivak, McClelland, Maier & Neustadt, P.C.

(57) ABSTRACT

A semiconductor radiation detector has a plurality of semiconductor cells arrayed in a matrix parallel to the X-Y plane. A plurality of common electrodes for applying an operating voltage to the semiconductor cells are arranged perpendicularly to the X-Y plane. A plurality of signal electrodes for reading out signals from the semiconductor cells are arranged perpendicularly to the X-Y plane. According to a feature of this invention, each common electrode is shared by a pair of semiconductor cells adjacent in the X direction, and each signal electrode is shared by a pair of semiconductor cells adjacent in the X direction. With this arrangement, the dead zone can be reduced to increase the pixel density, in other words, the spatial resolution. If the pixel density is kept unchanged, the sensible zone of the semiconductor cell can be widened to increase the detection sensitivity.

42 Claims, 35 Drawing Sheets

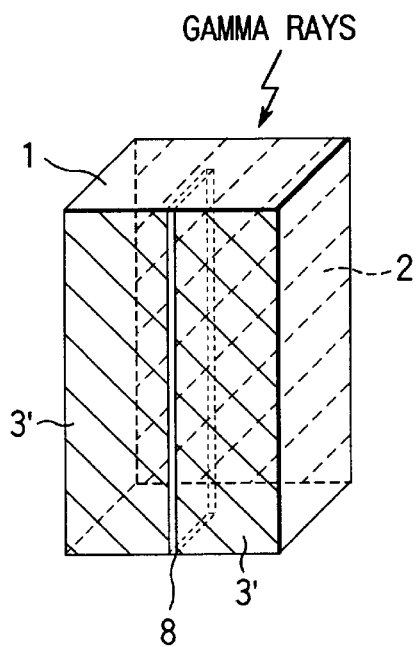
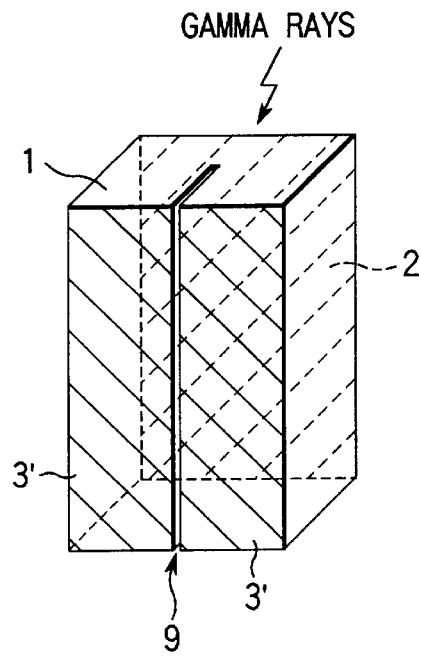
FIG. 8A     FIG. 8B
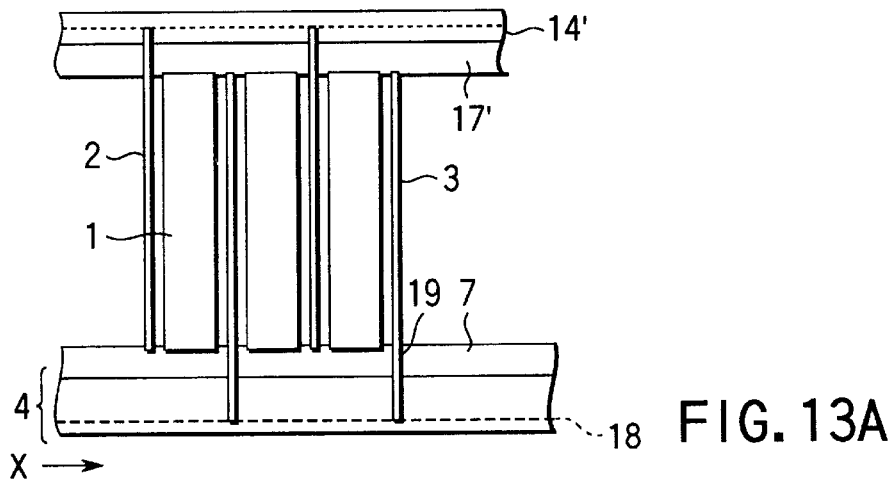
FIG. 13A
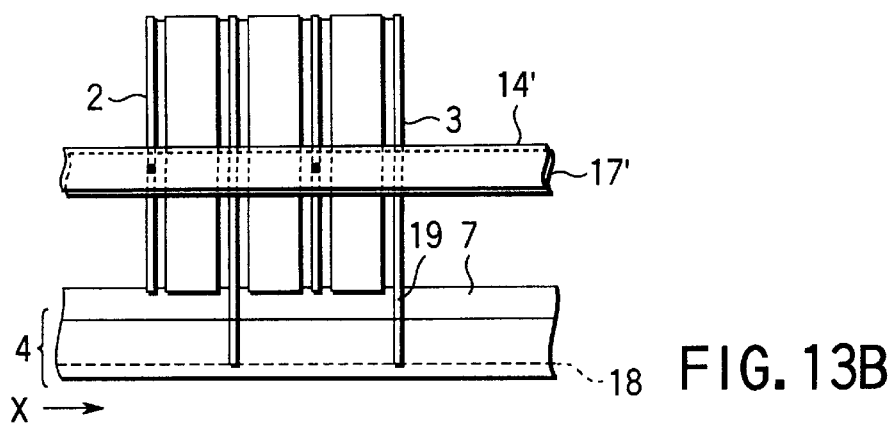
FIG. 13B

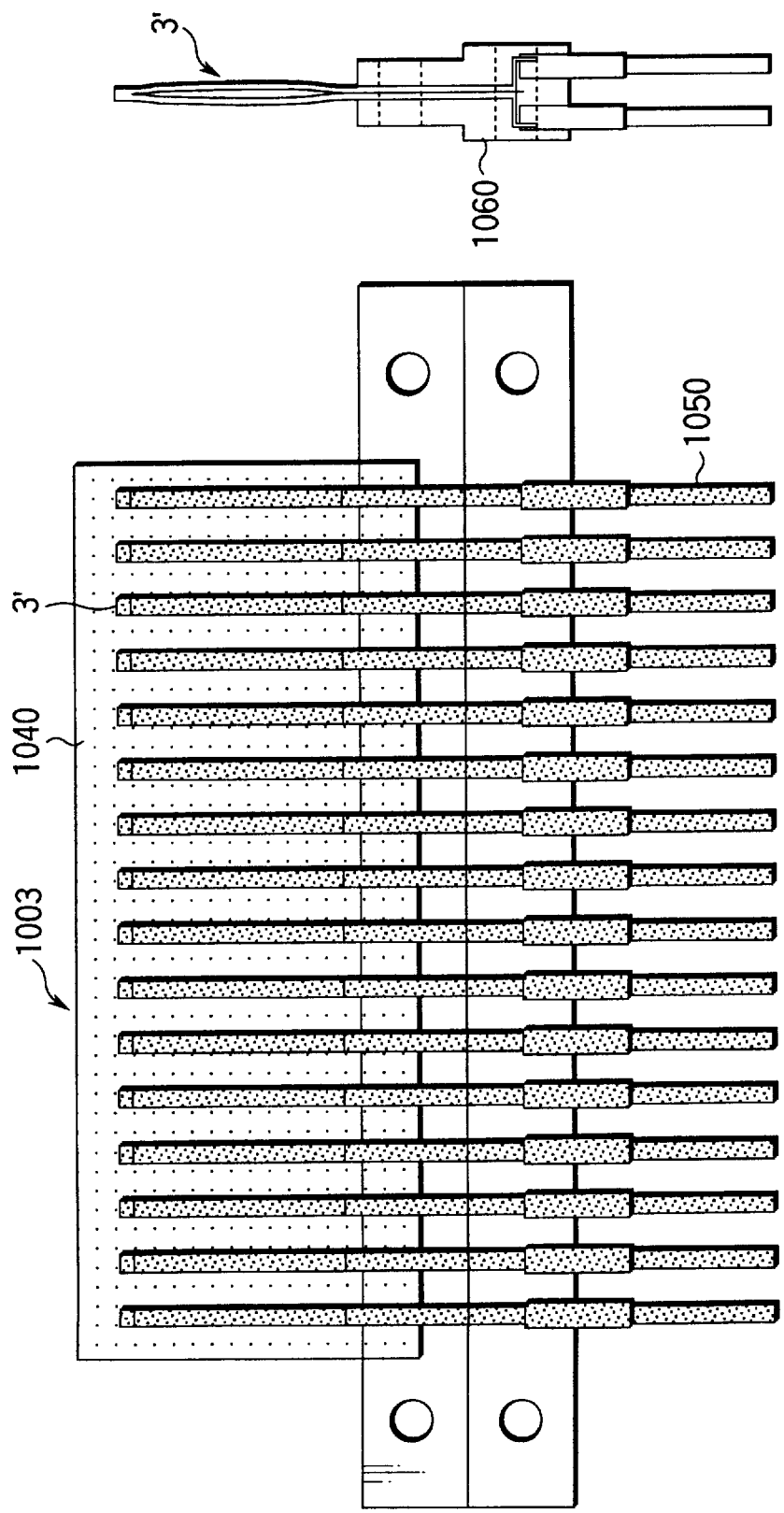

+ : SIGNAL
− : HIGH VOLTAGE (−800V∼−2000V)(PC)

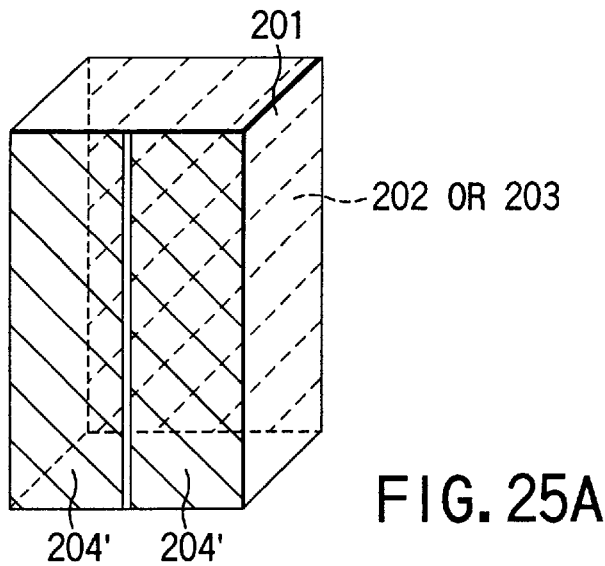
FIG. 25A
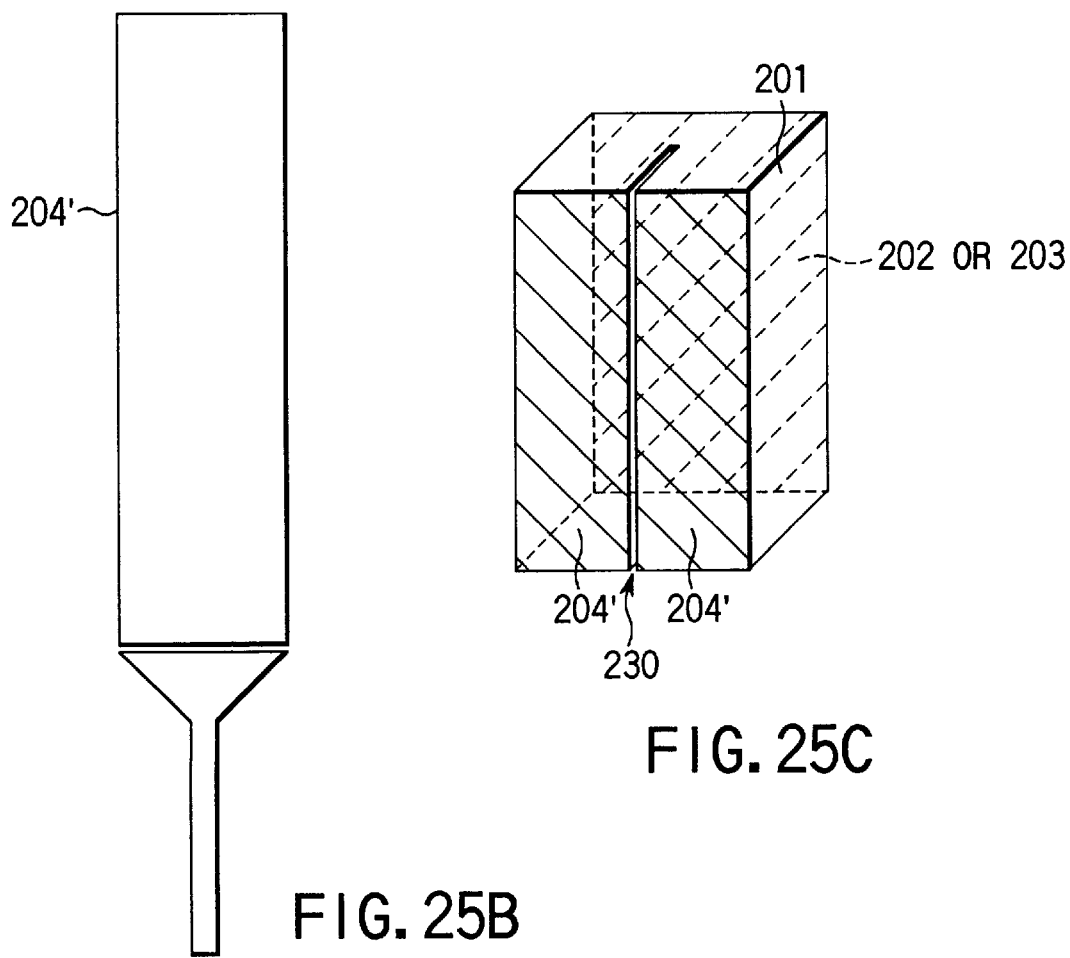
FIG. 25B
FIG. 25C

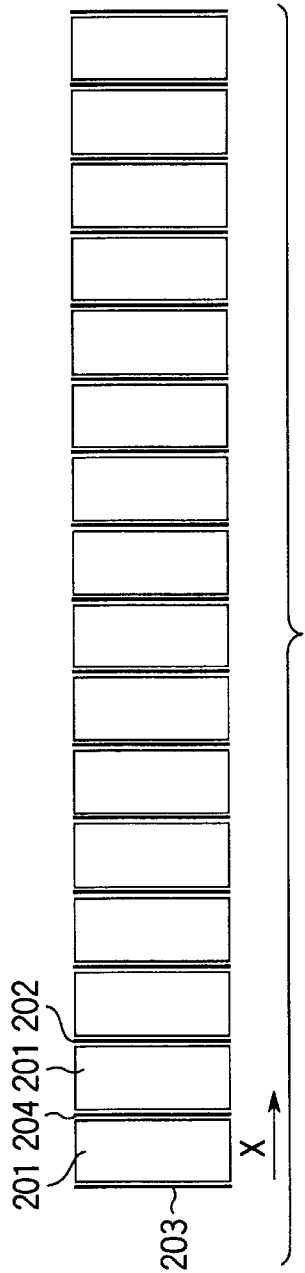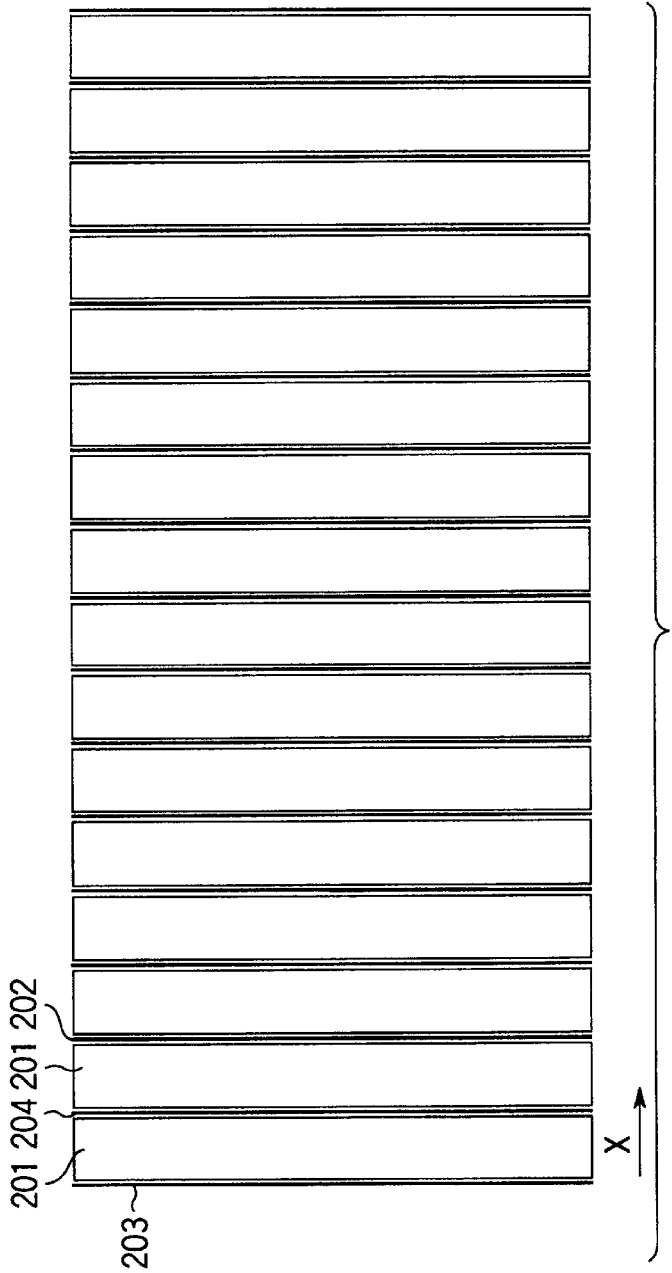

SEMICONDUCTOR RADIATION DETECTOR

BACKGROUND OF THE INVENTION

The present invention relates to a semiconductor radiation detector mounted on a nuclear medical diagnostic apparatus or the like.

A radiation detector for detecting a radiation (gamma ray) radiated from a radioisotope (RI) applied to an object to be examined is one of the most important constituent elements in the nuclear medical diagnostic apparatus. The performance of the radiation detector determines the apparatus performance such as the spatial resolution, energy resolution, counting efficiency, and the like.

At present, a scintillation detector is widely used as a radiation detector. The mainstream of the scintillation detector is an Anger detector using a combination of a scintillator (phosphor), a light guide, and a photomultiplier tube (PMT) array.

According to the detection mechanism of the scintillation detector, light generated by the scintillator upon incidence of a gamma ray is guided to the photomultiplier tube or photodiode by the light guide, and converted into an electrical signal by the photomultiplier tube or photodiode. The scintillation detector is very large in size and very heavy. Further, since the scintillation detector employs a two-stage structure of converting a gamma ray into light and light into an electrical signal, the energy resolution is low.

In recent years, a semiconductor detector has been introduced. In this semiconductor detector, a plurality of CdTe (cadmium telluride) semiconductor cells sandwiched between common and signal electrodes are arrayed in a matrix. When a gamma ray is incident on a semiconductor cell which receives a high voltage between the common and signal electrodes, electrons and holes generated in the semiconductor cell respectively move to the positive electrode (signal electrode) and the negative electrode. Induced charges are accumulated in a charge amplifier via the signal electrode. The charge amplifier outputs an electrical signal proportional to the energy of the incident gamma ray.

In this way, the semiconductor detector has a very simple detection mechanism of directly converting a gamma ray into an electrical signal by the semiconductor cell. Since the semiconductor cell can independently detect gamma rays, the energy resolution and counting efficiency are much higher than those of the scintillation detector. In addition, the semiconductor detector does not require any large-size, heavy scintillator, light guide, and photomultiplier tube, and thus can be downsized.

The conventional mainstream is a so-called lateral detector in which a gamma ray is incident on the semiconductor cell through the common electrode. Recently, a so-called vertical detector in which the semiconductor cell is arranged perpendicularly to the gamma ray incidence surface is proposed.

This vertical detector has various advantages compared to the lateral detector. First, the application voltage can be set lower in the vertical detector because the traveling distance of a gamma ray (photon) in the semiconductor cell is longer than in the lateral detector. Second, the pixel density, i.e., spatial resolution is higher in the vertical detector than in the lateral detector.

In the conventional vertical detector, however, since a plurality of small semiconductor cells must be arrayed in a matrix, the alignment precision decreases to generate a unique artifact. Note that in the lateral detector, since one semiconductor plate is divided into horizontal sections, the alignment precision is relatively high.

In the conventional vertical detector, since adjacent semiconductor cells must sandwich the signal electrode and insulating layer of one cell and the common electrode of the other cell, the blind zone, i.e., dead zone between the adjacent semiconductor cells increases to decrease the pixel density (decrease in sensitivity or spatial resolution).

The conventional vertical detector suffers the following problem. FIG. 1A is a plan view showing a conventional vertical semiconductor detector of one module. FIG. 1B is a side view when viewed from the arrow A in FIG. 1A. FIG. 1C is a sectional view taken along the line B—B in FIG. 1A. One module has a matrix of a plurality of semiconductor cells 101 each adhered to common and signal electrodes 102 and 104. A plurality of cell modules are arrayed to constitute a large-size semiconductor radiation detector.

In this case, the dead zone width between the cell of a given module and the cell of an adjacent module is much larger than the dead zone width between cells in one module, so a false image (artifact) is generated in the image.

A positron emission tomography (PET) uses a nuclide having a high energy of 511 keV. Photons having this high energy travel a long distance and may generate a photoelectric effect at a deep portion. As a result, a true incidence point and a point recognized on the apparatus side have a large error.

This problem will be described in detail. This problem occurs when the photon incidence angle is large, as shown in FIG. 2. When a gamma ray is incident on a certain semiconductor cell, and the cell outputs a signal, the apparatus recognizes the central point on the surface of this cell as an incidence point. When the photon incidence angle is large, the true incidence point and the recognition point (false incidence point) have a large error E.

BRIEF SUMMARY OF THE INVENTION

It is an object of the present invention to decrease the dead zone between semiconductor cells in a vertical semiconductor radiation detector.

It is another object of the present invention to increase the radiation position measurement precision in the vertical semiconductor radiation detector.

It is still another object of the present invention to increase the semiconductor cell alignment precision in the vertical semiconductor radiation detector.

According to the present invention, in a so-called vertical semiconductor radiation detector in which common and signal electrodes are arranged perpendicularly to the X-Y plane on which semiconductor cells are arrayed, the interval between the semiconductor cells, i.e., the dead zone is set to a width which is equal or smaller than ⅛ the total width of the interval and the sensible zone of each semiconductor cell, and equal or smaller than 400 μm, thereby increasing the pixel density (the spatial resolution). If the pixel density is kept unchanged, the sensible zone of the semiconductor cell can be widened to increase the S/N ratio.

According to the present invention, in a so-called vertical semiconductor radiation detector in which common and signal electrodes are arranged perpendicularly to the X-Y plane on which semiconductor cells are arrayed, each common electrode is shared by a pair of semiconductor cells adjacent in the X direction, and each signal electrode is shared by a pair of semiconductor cells adjacent in the X direction. The dead zone can be reduced to increase the pixel density (the spatial resolution). If the pixel density is kept unchanged, the sensible zone of the semiconductor cell can be widened to increase the S/N ratio.

According to the present invention, in a so-called vertical semiconductor radiation detector in which common and signal electrodes are arranged perpendicularly to the X-Y plane on which semiconductor cells are arrayed, each common electrode is shared by a pair of semiconductor cells adjacent in the X direction to downsize the dead zone and increase the pixel density (the spatial resolution). If the pixel density is kept unchanged, the sensible zone of the semiconductor cell can be widened to increase the detection sensitivity. Since the signal electrodes are individually arranged for the semiconductor cells, one cell can realize one channel.

According to the present invention, in a so-called vertical semiconductor radiation detector in which common and signal electrodes are arranged perpendicularly to the X-Y plane on which semiconductor cells are arrayed, each common electrode is divided into a plurality of common electrode elements in the Z direction (the direction of depth). Each semiconductor cell can therefore have a plurality of channels in the Z direction. The depth at which gamma rays/charge conversion occurs can be recognized to recognize the gamma ray position with high precision.

According to the present invention, in a so-called vertical semiconductor radiation detector in which common and signal electrodes are arranged perpendicularly to the X-Y plane on which semiconductor cells are arrayed, the semiconductor cells can be fitted in the slits of the case to easily increase the semiconductor cell alignment precision.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8A is a perspective view showing the outer appearance of one semiconductor cell in FIG. 3 which realizes two channels by one cell;

FIG. 8B is a perspective view showing another outer appearance of one semiconductor cell in FIG. 3 which realizes two channels by one cell;

FIG. 12A is a front view of a signal electrode plate in FIG. 10;

FIG. 12B is a side view of the signal electrode plate in FIG. 10;

FIG. 13A is a view showing the operating voltage line board arranged on the upper surface of the cell array in the first embodiment;

FIG. 13B is a view showing the operating voltage line board arranged on the side surface of the cell array in the first embodiment;

FIG. 25A is a perspective view showing the outer appearance of one semiconductor cell in FIG. 22 which realizes two channels by one cell;

FIG. 25B is a plan view showing one common electrode element in FIG. 25A;

FIG. 25C is a perspective view showing another outer appearance of one semiconductor cell in FIG. 22 which realizes two channels by one cell;

FIG. 30A is a plan view showing the cell array of one module in the second embodiment;

FIG. 30B is a side view showing the cell array of one module in FIG. 30A;

DETAILED DESCRIPTION OF THE INVENTION

Preferred embodiments of a semiconductor radiation detector according to the present invention will be described below with reference to the several views of the accompanying drawing. The semiconductor radiation detector includes a semiconductor X-ray detector mounted on a computer tomograph (CT scanner), a semiconductor gamma ray detector mounted on a nuclear medical diagnostic apparatus, and a semiconductor radiation detector mounted on a nondestructive examination apparatus. The present invention will exemplify a semiconductor gamma ray detector. The nuclear medical diagnostic apparatus images the internal distribution of a radioisotope (RI) applied to an object to be examined as a planar image or tomographic image (SPECT or PET).

(First Embodiment)

Figure 3:
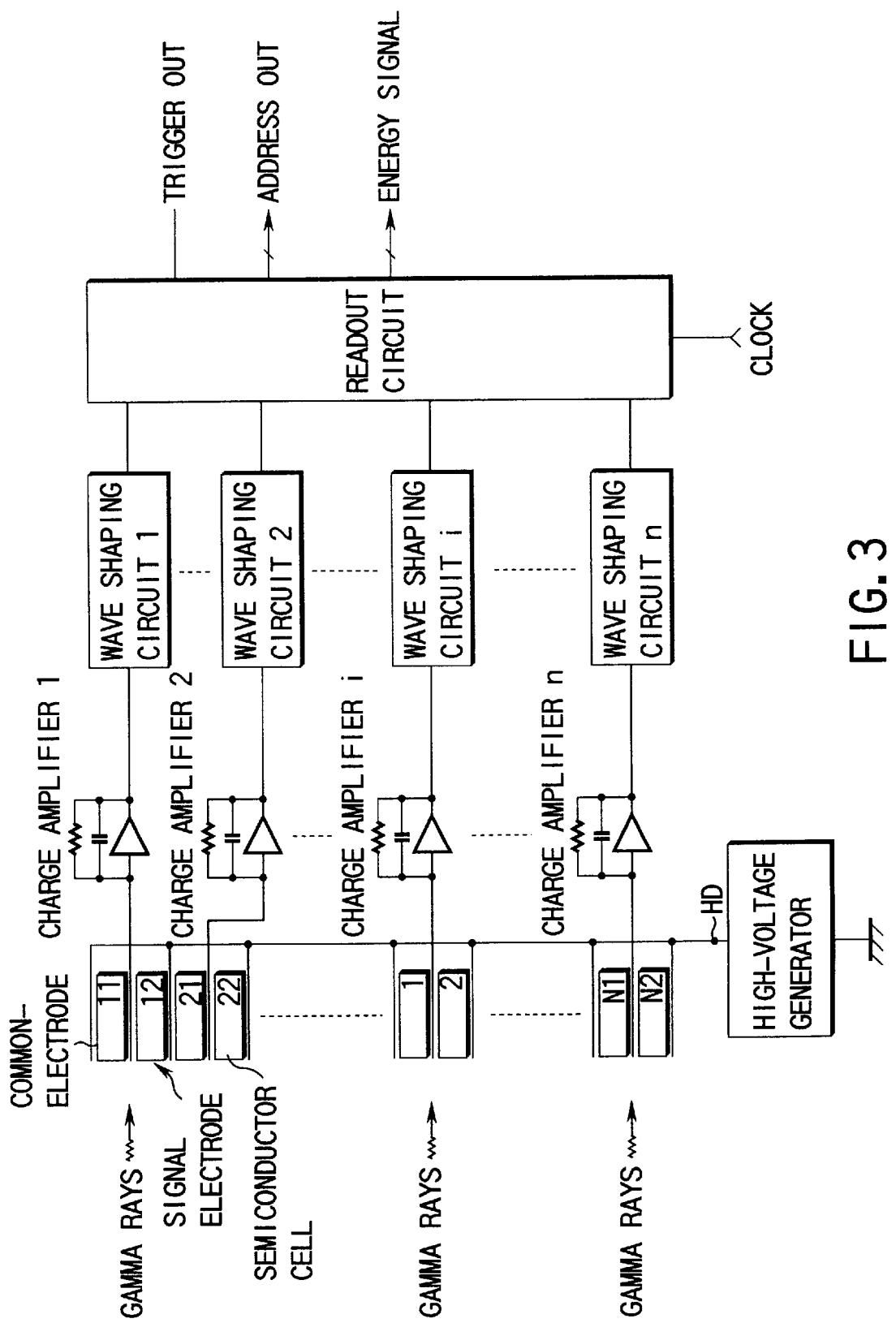
FIG. 3 is a block diagram showing a semiconductor gamma ray detector according to the first embodiment of the present invention.
Figure 4:
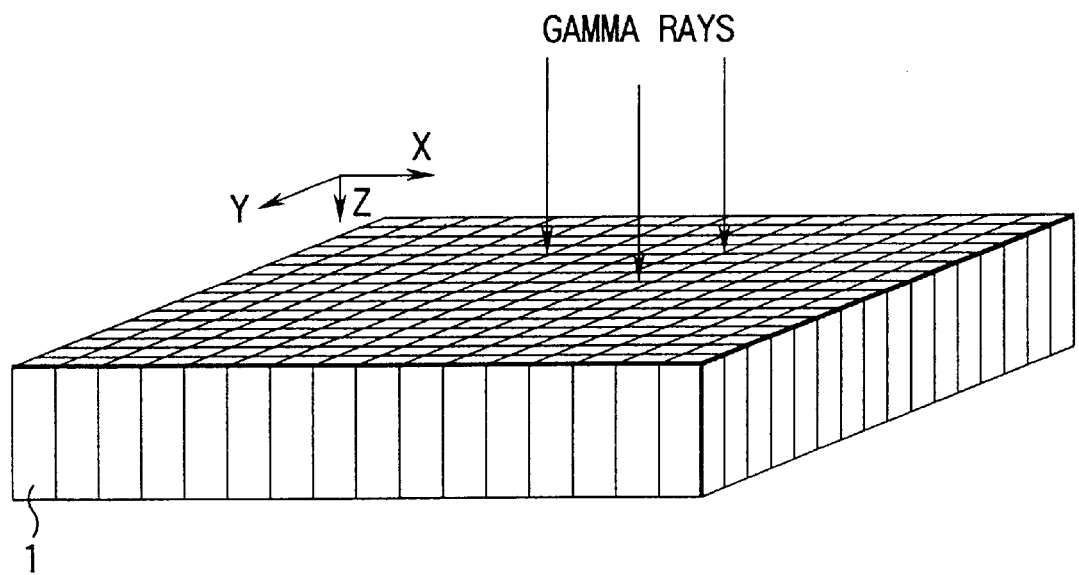
FIG. 4 is a perspective view of a semiconductor array in a semiconductor gamma ray detector according to the first embodiment of the present invention.
Figure 7:
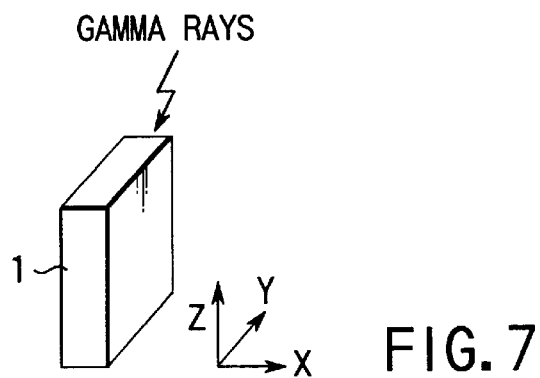
FIG. 7 is a perspective view showing the outer appearance of one semiconductor cell in FIG. 3.

FIG. 3 shows the arrangement of a semiconductor gamma ray detector according to the first embodiment. This semiconductor gamma ray detector comprises a semiconductor cell array in which a plurality of semiconductor cells 1 each shaped in a rectangular prism like the one shown in FIG. 7 are arrayed in a matrix on the X-Y plane, as shown in FIG. 4. The semiconductor cell array is of a so-called vertical type in which a plurality of signal electrodes 3 for reading out signals from the plurality of semiconductor cells 1 and a common electrode 2 for applying an operating voltage to the plurality of semiconductor cells 1 are arranged perpendicularly to the X-Y plane. This vertical type array is adopted in all the embodiments.

Figure 5:
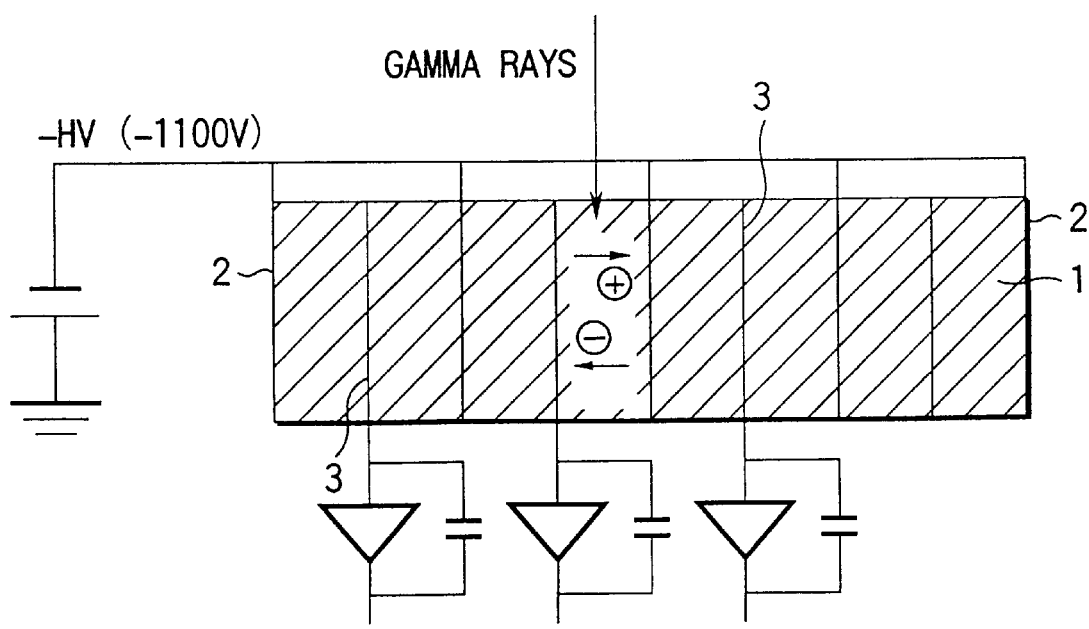
FIG. 5 is a view for explaining the principle of signal detection in the first embodiment.

As shown in FIG. 5, when a gamma ray is incident on the semiconductor cell 1 which receives the operating voltage (negative voltage) from an operating voltage generator via the common electrode 2, electrons(−) and holes(+) generated in the semiconductor cell 1 respectively move to the signal and common electrodes 3 and 2. Induced charges are accumulated in a charge amplifier 2000 via the signal electrode 3. The charge amplifier 2000 outputs a signal having a peak value corresponding to the energy of the incident gamma ray. The output signal is shaped by a wave shaping circuit and sent to a readout circuit. The readout circuit outputs an address signal representing the detected position of the semiconductor cell, an energy signal representing the energy of the incident gamma ray, and a trigger signal representing the incidence timing of the gamma ray.

Figure 6A:
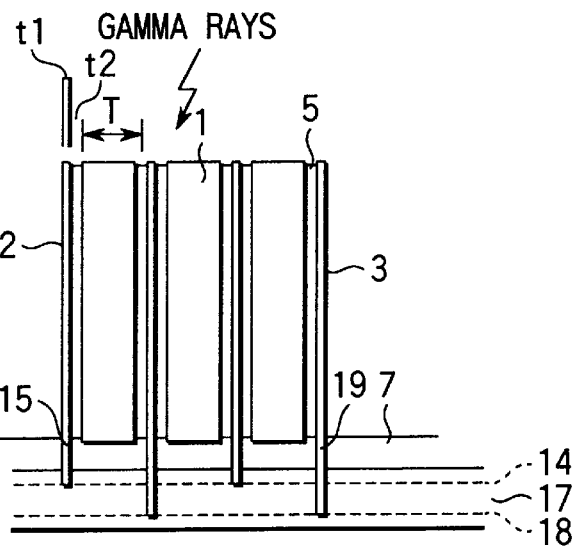
FIG. 6A is a partial sectional view of the cell array in FIG. 3 in the X direction.
Figure 6B:
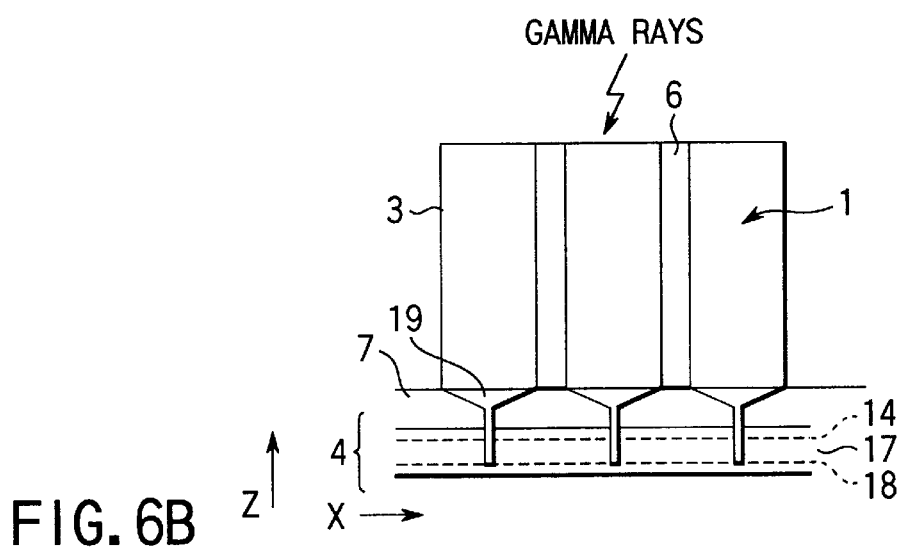
FIG. 6B is a partial sectional view of the cell array in FIG. 3 in the Y direction.

As shown in FIGS. 6A and 6B, the signal and common electrodes 3 and 2 are alternately arranged to share each signal electrode 3 by a pair of semiconductor cells 1 adjacent in the X direction, and share each common electrode 2 by a pair of semiconductor cells 1 adjacent in the X direction. The common and signal electrodes 2 and 3 are adhered to the side surfaces of semiconductor cells 1 with a conductive adhesive 5. Since the signal and common electrodes 3 and 2 are shared by a pair of semiconductor cells 1 adjacent in the X direction, only one signal or common electrode 3 or 2 is arranged at the interval between semiconductor cells 1.

The interval between the semiconductor cells 1, i.e., the dead zone where no gamma ray can be detected can be reduced to a width which is equal or smaller than approximately ⅛ the width of the gamma ray incidence plane of one semiconductor cell 1, i.e. the width of the sensible zone, and is smaller than approximately 400 μm. In the conventional detector, since semiconductor cells 1 must sandwich one signal electrode 3 for a semiconductor cell 1, one common electrode 2 for an adjacent semiconductor cell 1, an insulating layer between the signal and common electrodes 3 and 2, and the potential difference between the signal and common electrodes is as large as 1,000V, the dead zone cannot be reduced to a width which is equal or smaller than ⅛ the total width of the interval and the sensible zone, and is equal or smaller than 400 μm.

Figure 9:
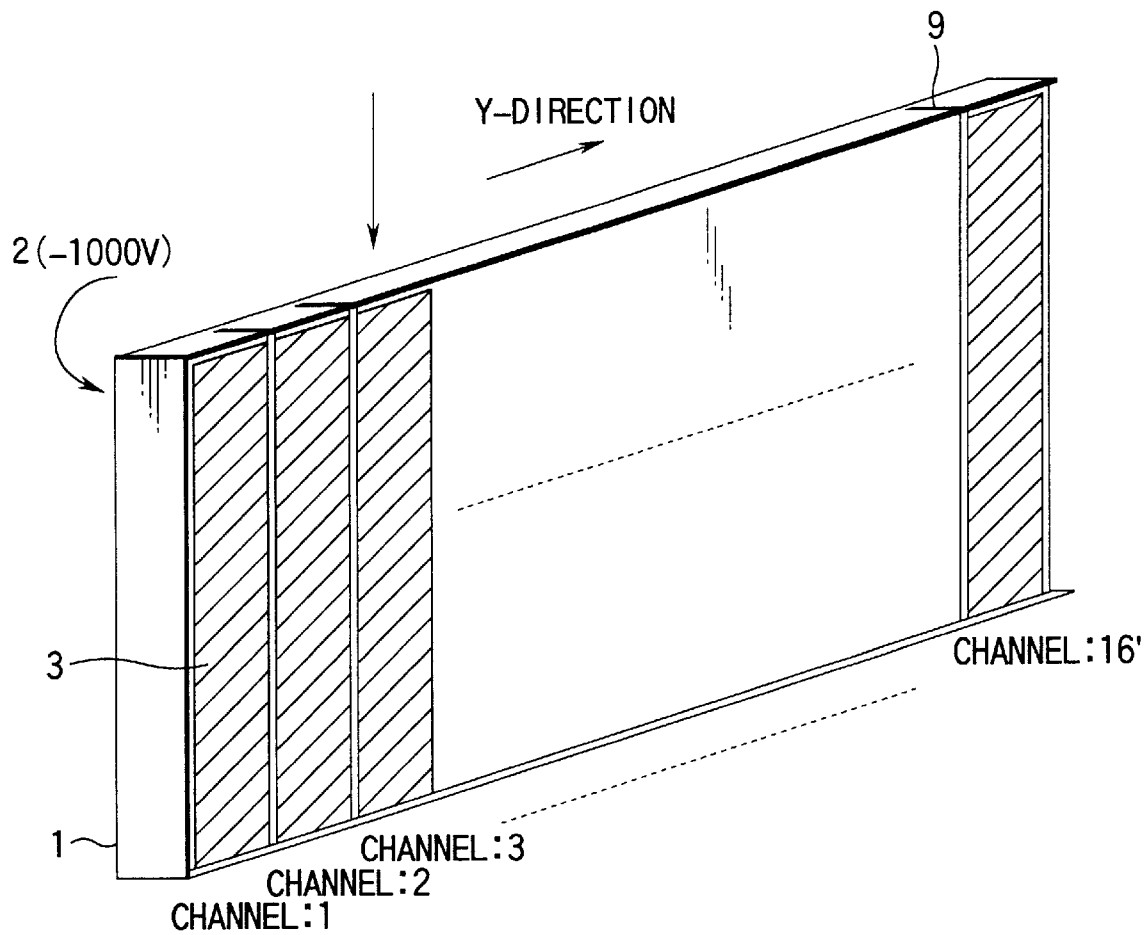
FIG. 9 is a perspective view of a multichannel semiconductor cell in the first embodiment.

As shown in FIGS. 8A and 8B, the signal electrode 3 of each semiconductor cell 1 may be electrically divided into a plurality of (two in this case) signal electrode elements 3' by a dielectric isolation layer 8 or 9 in the Y direction. In this case, this division can realize two channels per cell. The dielectric isolation layer 8 or 9 may be a dielectric isolation layer 8 (FIG. 8A) formed by ion-implanting semiconductor crystals or a dielectric isolation layer (notched groove) 9 (FIG. 8B) prepared by forming a notched groove in the semiconductor cell 1 by etching or the like. As shown in FIG. 9, 16 (2") signal electrode elements 3' may be connected to one semiconductor cell 1. In this case, a multi-channel arrangement can be realized for each cell.

When the notched groove 9 is formed, it may be hollow or filled with an insulating resin. The thickness (width) of the dielectric isolation layer 8 or 9 can be set equal to the distance between semiconductor cells 1 adjacent in the X direction to also make blind zones in the X and Y directions uniform. If the semiconductor cell 1 is divided in this manner, the number of semiconductor cells 1 required to constitute a cell array having the same number of channels can decrease to decrease the number of assembly steps, compared to the case in which no semiconductor cell is divided. At the same time, the dielectric isolation layer 8 or 9 can be formed by a general method with high precision to increase the assembly precision. If two signal electrodes 3 are coupled in advance with a predetermined interval while maintaining their insulating states by an insulating coupling member, and adhered to semiconductor cells 1, the assembly process and precision can be simplified and increased. In this case, one semiconductor cell 1 is divided into two semiconductor cells to form two channels. If necessary, one semiconductor cell 1 may be divided into a larger number of semiconductor cells to form a larger number of channels.

Figure 10:
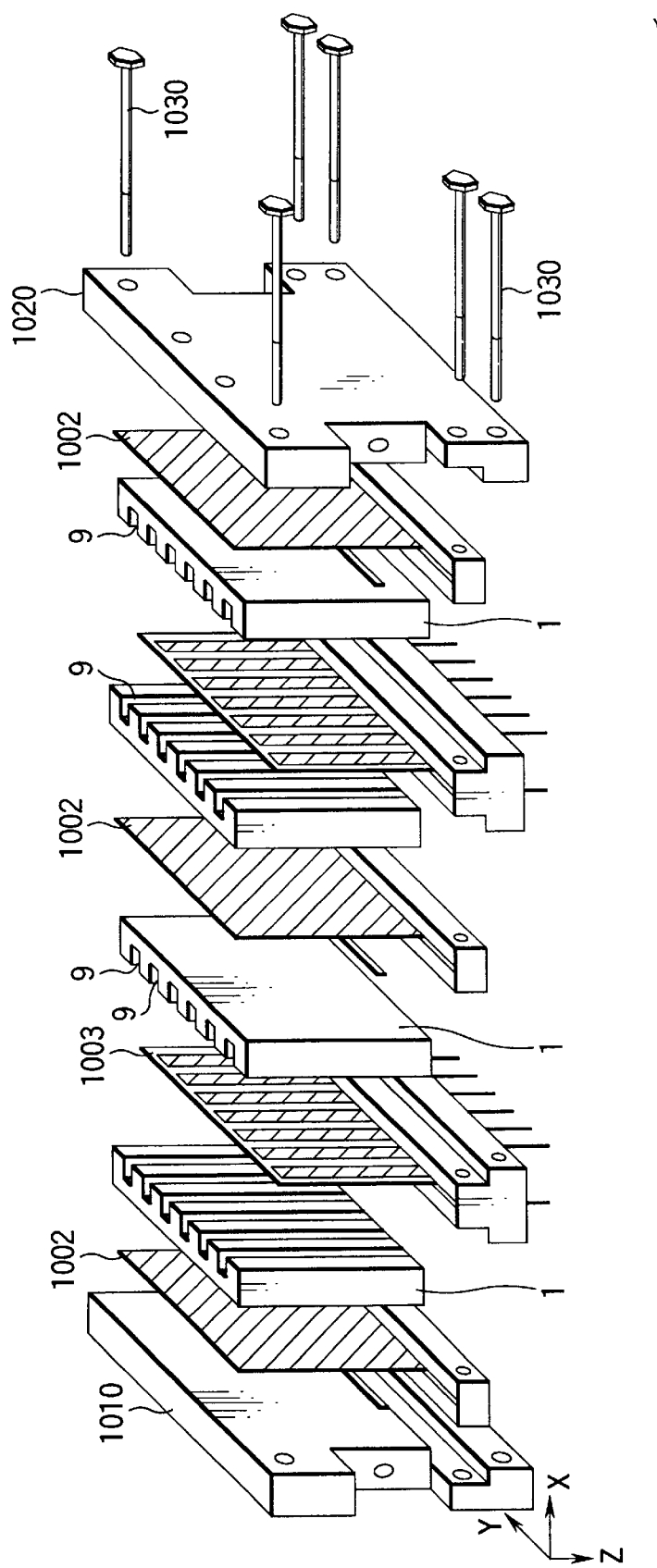
FIG. 10 is an exploded view of one semiconductor module in the first embodiment.
Figures 11A, 11B:
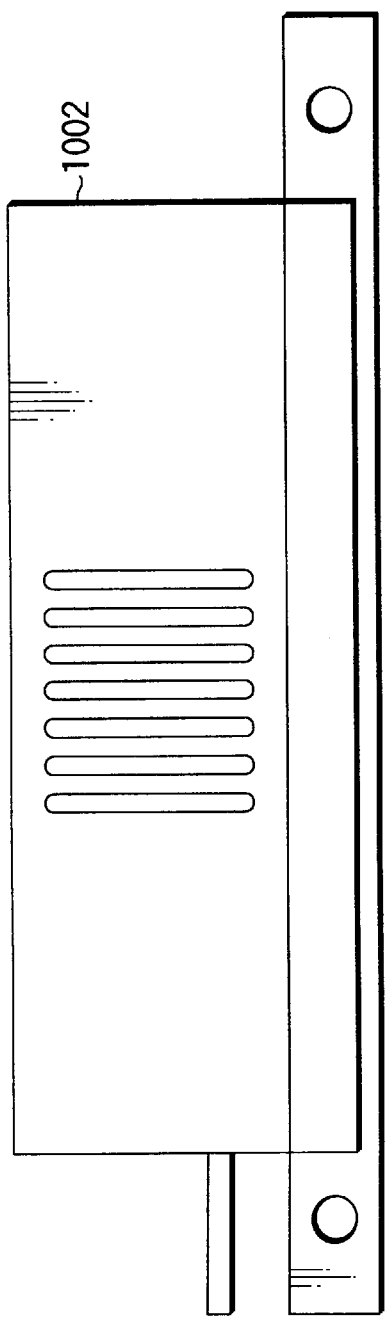
FIG. 11A is a front view of a common electrode plate in FIG. 10.
FIG. 11B is a side view of the common electrode plate in FIG. 10.

A cell array is a set of a plurality of semiconductor modules. FIG. 10 is an exploded view of one semiconductor module. As the semiconductor module, an assembly of a plurality of common electrode plates 1020, the plurality of semiconductor cells 1, and a plurality of signal electrode plates 1003 is sandwiched between frames 1010 and 1020 and fixed with a pin 1030.

As shown in FIGS. 12A and 12B, the common electrode 2 of the common electrode plate 1002 has a leaf spring structure, and the spring force of the common electrode 2 ensures electrical connection to the semiconductor cell 1. The plate 1002 is partially cut to suppress the spring force.

As shown in FIGS. 13A and 13B, the signal electrode plate 1003 is obtained by arraying the plurality of signal electrodes 3 on an insulating substrate 1040. The signal electrode 3 has a leaf spring structure, and the spring force of the signal electrode 3 ensures the electrical connection to the semiconductor cell 1.

Figure 14:
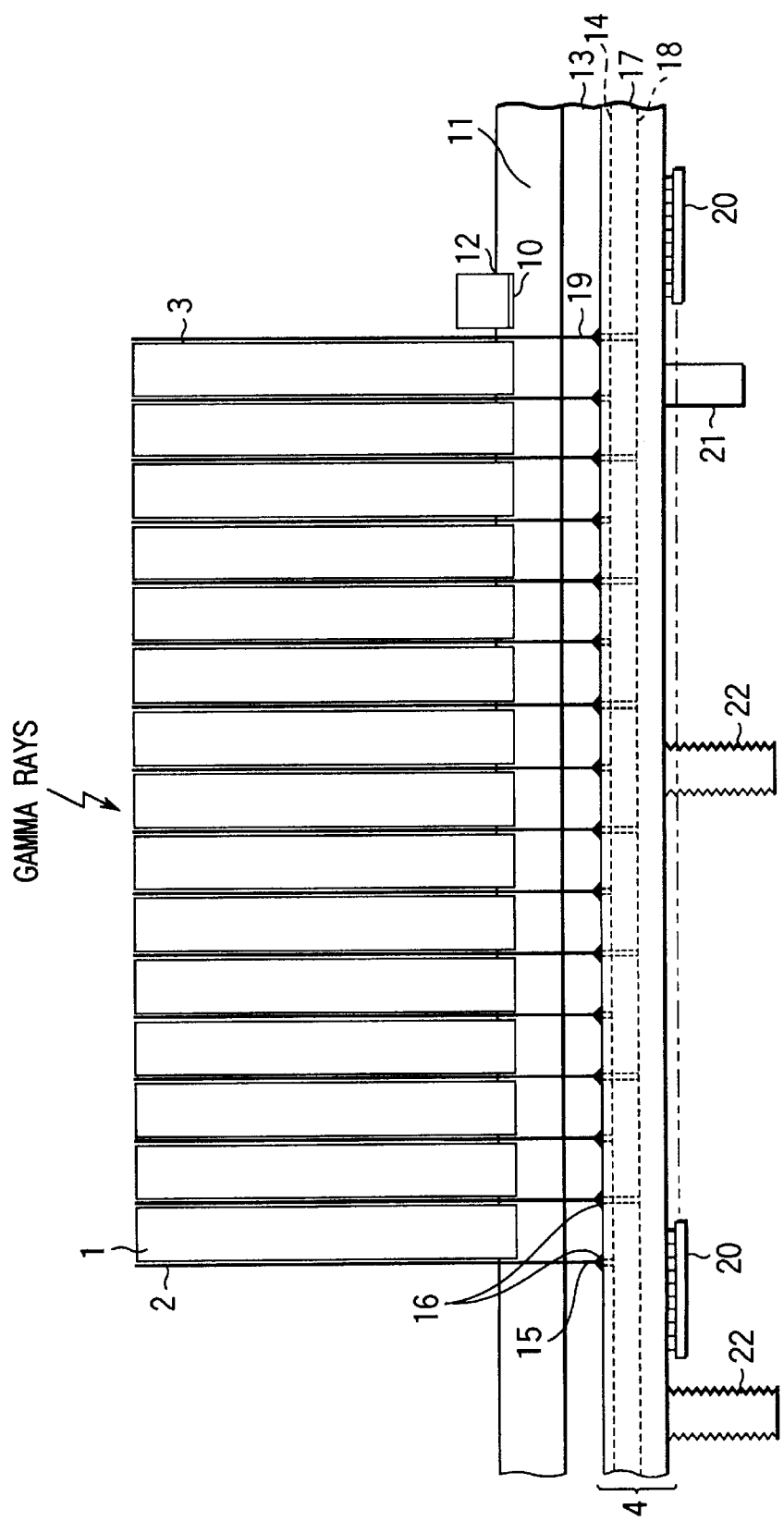
FIG. 14 is a sectional view showing on e module constituting the semiconductor gamma ray detector according to the first embodiment.

The semiconductor cell 1 and the common and signal electrodes 2 and 3 can be mounted on a multilayered substrate 4 via an insulating layer 7, as shown in FIGS. 6A and 6B. Instead, the cell 1 and the electrodes 2 and 3 may be mounted via an insulating layer 12 on an alignment substrate 11 having notched portions 10 for defining the distances between semiconductor cells in the X and Y directions to a predetermined equal interval, as shown in FIG. 14, which leads to high assembly precision and good workability. More specifically, as shown in FIG. 6A, T represents the thickness of the semiconductor cell 1 in the X direction, t1 represents the thickness of the common or signal electrode 2 or 3, and t2 represents the thickness of the conductive adhesive 5 between a cell and electrode. One pair of semiconductor cells have a sensible zone of 2T and a blind zone (dead zone) of 2t1+4t2, and the thickness (width) of the blind zone between adjacent semiconductor cells is t1+2•t2. If the predetermined equal interval is set to t1+2•t2, a semiconductor cell array in which the distances between semiconductor cells in the X and Y directions are set to the predetermined equal interval (t1+2•t2) can be constituted. By using a relatively rigid metal such as beryllium copper as an electrode material, the electrode thickness t1 can be set as small as about 1/30 T. The thickness of the conductive adhesive layer can be set to about 1/30 T, and the thickness (t1+2•t2) of the blind zone can be made uniform with a thickness of about 1/10 T. Even in this arrangement, the distances between cells may slightly vary. In this case, variations are corrected by adjusting the thickness of the conductive adhesive 5 for adhering the electrode to the cell in the X direction, and adjusting the thickness of an insulating layer 6 between cells in the Y direction.

This cell array is mounted on the multilayered substrate 4 via the insulating layer 7 shown in FIGS. 6A and 6B or an insulating layer 13 shown in FIG. 14. A voltage line layer 14 is formed on or near a surface of the multilayered substrate 4 on which the semiconductor cell 1 is mounted, and electrically connected to a lead wire 15 of the common electrode 2 by a low-temperature solder 16 or the like. An insulating substrate 17 having a high breakdown voltage of about 2,000V is formed below the voltage line layer 14 to ensure insulation, suppress leakage between an application voltage and a signal, and increase the S/N ratio. A signal line layer 18 is formed on a surface of the insulating substrate 17 opposite to the voltage line layer 14, and electrically connected to a lead wire 19 of the signal electrode 3. At this time, the signal line layer 18 is electrically divided into multiple layers via the insulating substrate 17, or internally electrically divided into a plurality of interconnections, thereby ensuring one-to-one correspondence between each interconnection and the signal electrode 3. The voltage line layer 14 may not be or may be electrically divided. In the first embodiment, the signal line layer 18 is internally electrically divided, and the voltage line layer 14 is not divided.

As shown in FIG. 13A, an operating voltage line board 14' having a voltage line for applying an operating voltage to the common electrode 2 may be separated from the multilayered substrate 4 having a signal line, and formed on a surface of an insulating layer 17' opposite to the multilayered substrate 4 via a cell array, thereby physically separating the signal and voltage lines and increasing the S/N ratio. Alternatively, as shown in FIG. 13B, the operating voltage line board 14' may be formed on the side surface of the cell array via the insulating layer 17' to obtain the same effects.

As shown in FIG. 14, a signal processor 20 made up of the charge amplifier, wave shaping circuit, readout circuit, and the like, an output connector 21, and a support leg 22 for aligning and fixing the module are arranged on the rear surface of the multilayered substrate 4. In FIG. 14, the signal processor 20 is integrated with the multilayered substrate 4. If necessary, the signal processor 20 may be separately arranged for each module or may be arranged at a portion except for the multilayered substrate such as the rear surface of a module installation surface of a motherboard. When the signal processor 20 is mounted on the multilayered substrate 4, as shown in FIG. 14, the output connector 21 for outputting a semiconductor signal receives a signal from the signal processor 20 and outputs it to the motherboard. When the signal processor 20 is not mounted on the multilayered substrate 4, the output connector 21 receives a signal from the signal line layer 18 and outputs it to the signal processor 20.

The support leg 22 formed on the rear surface of the multilayered substrate 4 is fixed to a predetermined position on a cooling plate at the projection end with a nut or the like to align and support the module and dissipate heat. The support leg of the module serves as a support means, alignment/fixing means, and head dissipation means. At this time, the cooling plate can be arranged between the module and motherboard or on a surface of the motherboard opposite to the module installation surface. The cooling plate is preferably made of a material having high heat dissipation efficiency, e.g., a metal having a large heat capacity such as copper, and desirably comprises a means for cooling the cooling plate, such as a cooling fan.

Noise can be prevented by mounting a collimator on the gamma ray incidence plane of the semiconductor cell array and attaching a shield to a side surface parallel to the gamma ray incidence direction.

In this fashion, the semiconductor radiation detector of the first embodiment in which the semiconductor cell 1 and the common and signal electrodes 2 and 3 are mounted on the multilayered substrate 4 is constituted. The detector is formed from a two-dimensional semiconductor cell array in this embodiment, but can be formed from a one-dimensional semiconductor cell array, as needed. In the detector of this embodiment, since only one of the common and signal electrodes 2 and 3 is sandwiched between adjacent cells 1, the dead zone can be greatly reduced to increase the cell density in the X direction. Moreover, in this embodiment, since the signal electrode is divided in the Y direction to realize two channels by one semiconductor cell, the cell density in the Y direction can be substantially doubled.

In the first embodiment, since the signal and common electrodes are isolated by the semiconductor cell 1, no noise is mixed in a signal passing through the signal electrode 3 by leakage of an operating voltage from the common electrode 2. Accordingly, a signal having a high S/N ratio can be obtained.

Figure 15:
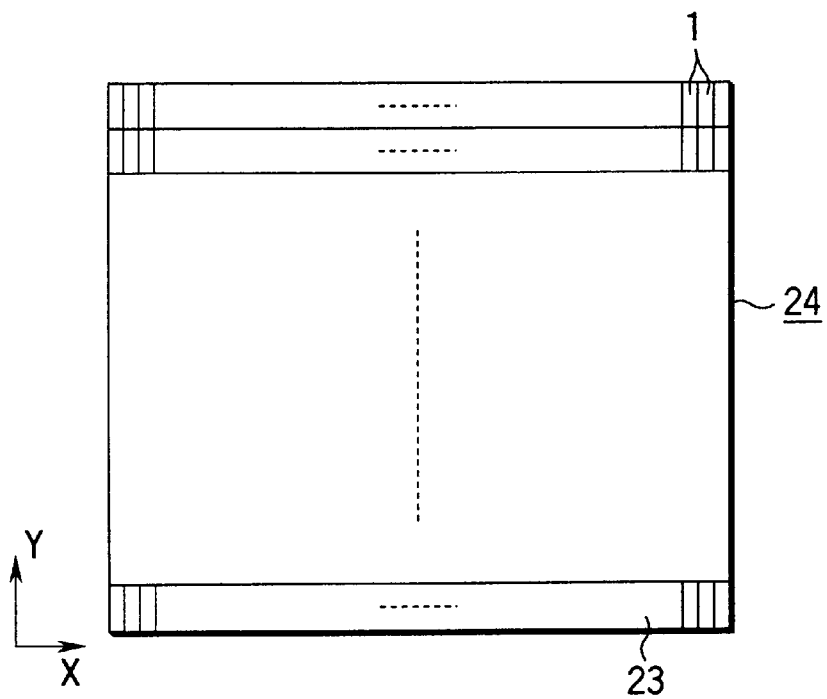
FIG. 15 is a plan view showing the semiconductor gamma ray detector according to the first embodiment when viewed from the gamma ray incidence direction.

As shown in FIG. 15, the first embodiment ensures a large field of view by arranging a plurality of cell array modules 23 parallel in the Y direction. In this case, the distance between semiconductor cells adjacent in the Y direction is made equal to the distance (t1+2·t2) in the module by filling the joint between adjacent modules 23 with an insulating material or fixing the joint with an insulating tape. When modules 23 are also joined in the Y direction to constitute a two-dimensional detector module array having a larger field of view, the sizes of blind zones are made uniform by the same method as the joint in the X direction, and voltage line layers 14 of adjacent modules 23 are electrically connected via a connection terminal.

When, therefore, the cell array is constituted while joining of sides (sides in the Y direction) having the connection terminals of the voltage line layers 14 of the detector modules 23 is avoided as much as possible, high assembly precision and a smaller number of steps can be realized.

Figure 16:
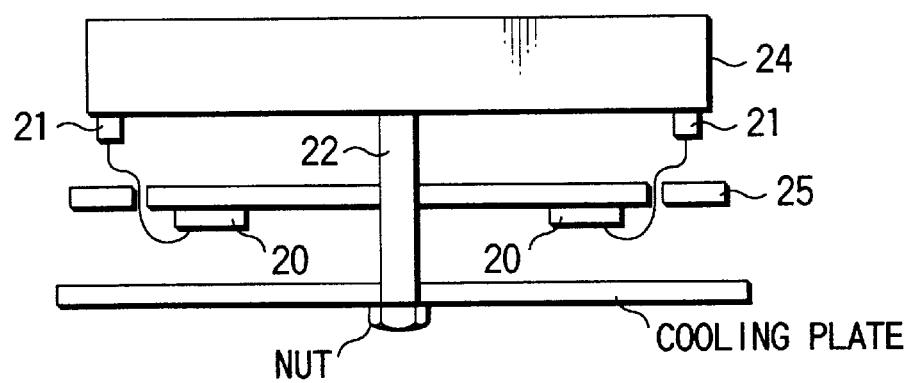
FIG. 16 is a sectional view showing the cooling plate of the semiconductor gamma ray detector according to the first embodiment.

As shown in FIG. 16, in the first embodiment, the signal processor 20 is mounted on the rear surface of the detector module installation surface of a motherboard 25 instead of the multilayered substrate 4. A semiconductor signal is sent to the output connector 21 via the signal line layer 18 inside the multilayered substrate 4 of each module 23, and output from the output connector 21 to the signal processor 20 mounted on the motherboard 25 via an appropriate signal line. The signal processor 20 can be mounted on the multilayered substrate 4. In this case, components such as a readout circuit must be arranged in units of modules. If the signal processor 20 is mounted on a portion except for the multilayered substrate 4, like the first embodiment, components need not be arranged in units of modules, which is advantageous for circuit design.

When a collimator is to be mounted on the gamma ray incidence plane of a cell array 24, it may be arranged for each detector module 23 but can be advantageously arranged for a plurality of detector modules 23 or the whole cell array 24. A shield is attached to only a side surface defining four sides parallel to the gamma ray incidence plane of the cell array.

Figure 17A:
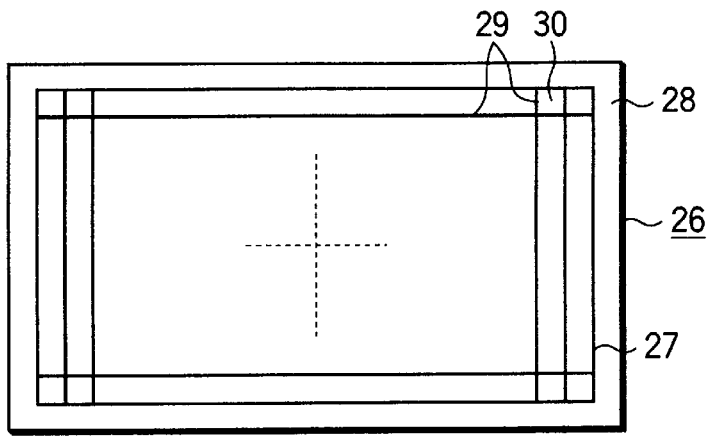
FIG. 17A is a plan view showing the semiconductor gamma ray detector on which a collimator is mounted in the first embodiment when viewed from the gamma ray incidence direction.
Figure 17B:
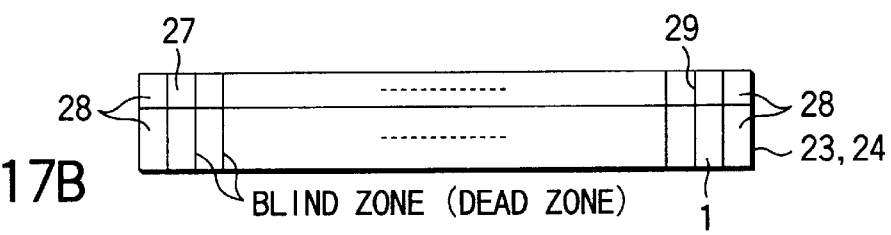
FIG. 17B is a sectional view showing the semiconductor gamma ray detector in FIG. 17A.
Figure 17C:
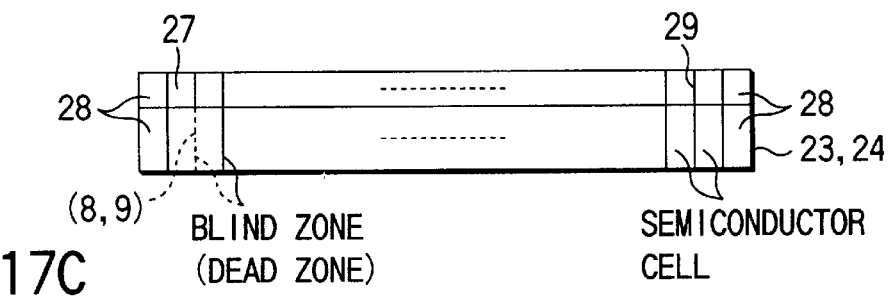
FIG. 17C is a sectional view showing the semiconductor gamma ray detector in FIG. 17A.

A technique of uniformly reducing the blind zone by adjusting the shape and installation position of the collimator mounted on the gamma ray incidence plane of the cell array will be explained. As shown in FIGS. 17A, 17B, and 17C, a collimator 27 is mounted on the gamma ray incidence plane of a cell array (or module array) 26. A shield 28 is attached around the collimator 27.

Scepters (collimator plates or leafs) 29 of the collimator 27 are formed with a shape and size corresponding to the shape and size of the dead zone of the semiconductor cell array. The scepters 29 are assembled into a grating in accordance with the cell array. A collimator hole 30 surrounded by the scepters 29 is formed into a rectangular shape in accordance with the semiconductor cell 1. By forming the scepter 29 to overlap the blind zone as much as possible, the shadow of the scepter 29 on the sensible zone in the conventional detector, i.e., a portion of the sensible zone where no gamma ray can be detected can be decreased to minimize the sensitivity loss and increase the effective performance of the detector. This can be achieved because the blind zones of the semiconductor radiation detector (module 23 and array 24) have uniform sizes and positional relationships. In the conventional detector, particularly in the conventional cell array, the collimator scepters cannot be manufactured or are uneconomically manufactured in accordance with blind zones having nonuniform sizes and positional relationships.

Figure 18A:
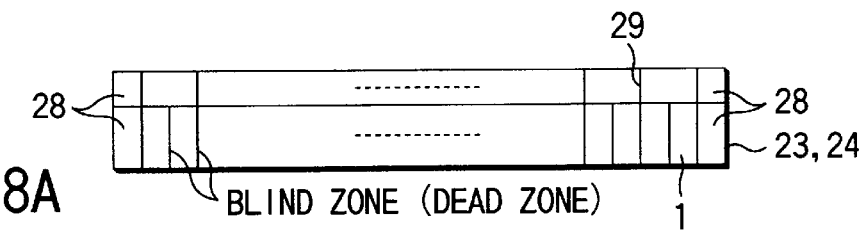
FIG. 18A is a sectional view showing the semiconductor gamma ray detector on which another collimator is mounted in the first embodiment.
Figure 18B:
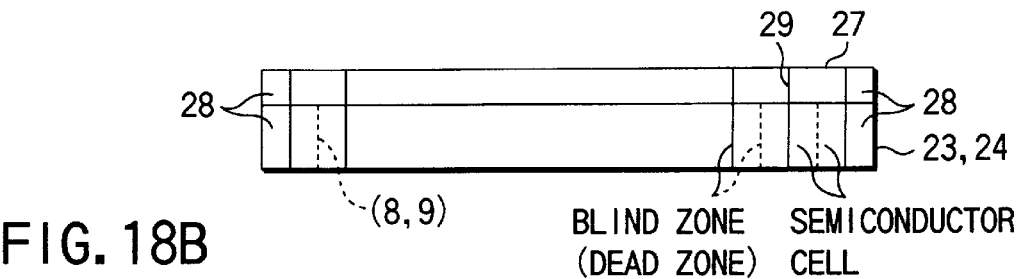
FIG. 18B is a sectional view showing the semiconductor gamma ray detector on which still another collimator is mounted in the first embodiment.
Figure 19A:
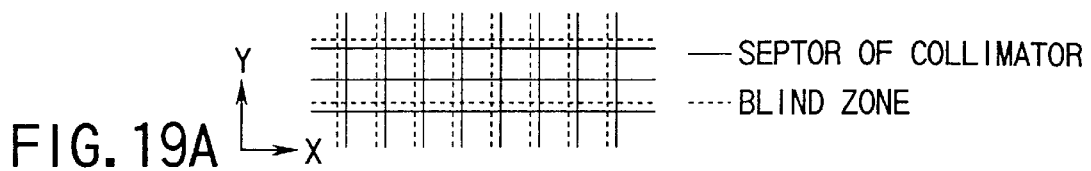
FIG. 19A is a plan view showing alignment of the cell array and collimator in the first embodiment.
Figure 19B:
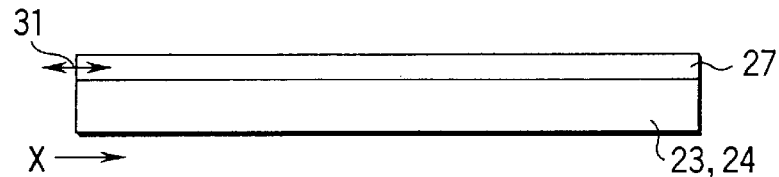
FIG. 19B is a sectional view showing alignment of the cell array and collimator in the X direction in the first embodiment.
Figure 19C:
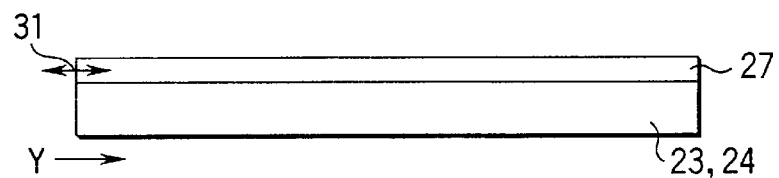
FIG. 19C is a sectional view showing alignment of the cell array and collimator in the Y direction in the first embodiment.

When the scepter 29 of the collimator 27 according to the first embodiment is variously changed in size and mounted on the detector, a detector having a different gamma ray detection sensitivity and resolution can be designed in accordance with the intended use without changing any portion of the detector except for the collimator. That is, when the detector is used with an incident gamma ray having a high energy, it adopts a collimator with a thick scepter made by increasing the scepter size (scepter thickness) in a plane direction perpendicular to the gamma ray incidence direction. When the detector is used with a high resolution, it adopts a collimator with a tall scepter made by increasing the scepter size (scepter height) in a direction parallel to the gamma ray incidence direction of the scepter. A detector which meets the intended use can be easily obtained. The gamma ray detection sensitivity can also be increased using a collimator having scepters in units of a plurality of blind zones (dead zones) so as to form gratings having a predetermined size, e.g., a double-period collimator (see FIGS. 18A and 18B) having n×m scepters so as to form gratings each surrounding each semiconductor cell or each pair of semiconductor cells with respect to 2n×m blind zones forming gratings each surrounding each semiconductor cell or each pair of semiconductor cells.

The cell array and collimator are accurately aligned by an installation apparatus. As shown in FIGS. 19A, 19B, 19C, and 20, the collimator installation apparatus comprises a collimator moving mechanism 31 so as to move the collimator 27 in the X or Y direction with respect to the cell array 23 or 24 and match the scepter 29 of the collimator 27 with the dead zone of the cell array when the collimator 27 is shifted in mounting or using the collimator 27. The position of the collimator 27 can be easily adjusted in not only an assembly location but also a use location to facilitate the manufacture and maintenance of the semiconductor radiation detector. The collimator installation apparatus is not limited to this, and an automatic relative collimator position adjusting system shown in FIG. 20 can be employed.

Figure 20:
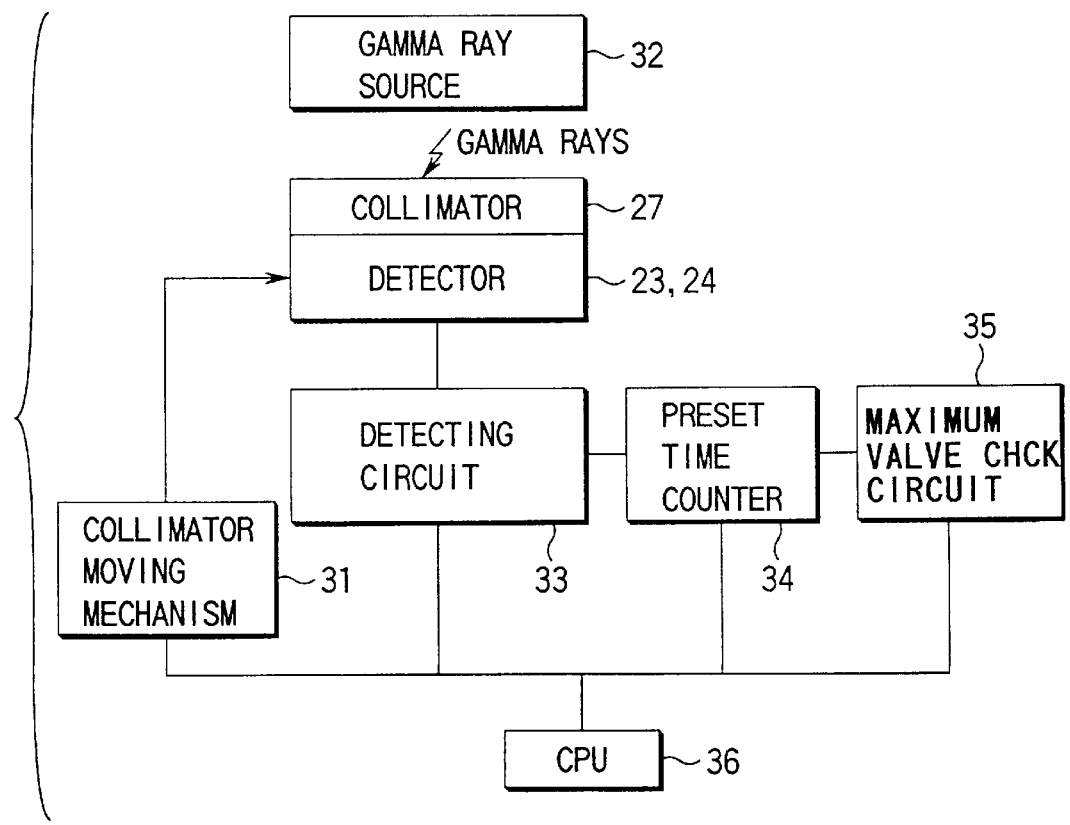
FIG. 20 is a block diagram showing the collimator alignment system in the first embodiment.

As shown in FIG. 20, the collimator installation apparatus of the first embodiment is substantially constituted by the collimator moving mechanism 31 such as an electric shift mechanism, a gamma ray source 32 serving as a surface or line ray source, a gamma ray detection circuit 33, a preset time counter 34, a maximum value check circuit 35, and a CPU (Central Processing Unit) 36. While the collimator 27 is moved using the collimator moving mechanism 31, a gamma ray is radiated from the gamma ray source 32 set in front of the collimator 27, and a signal output from the semiconductor radiation detector 23 or 24 is processed by the detection circuit 33 and preset time counter 34 to obtain a count value including the observed gamma dose and the observation time of the gamma dose. This count value is checked by the maximum value check circuit 35 to determine the observation time of the maximum value of the gamma dose. The CPU 36 determines the collimator position in this observation time, and moves and adjusts the collimator 27 to the position in the observation time using the collimator moving mechanism 31. If the detector side comprises a means for mechanically one-dimensionally determining the collimator mounting position, e.g., a guide means such as a guide rail, only a collimator mounting position in the remaining one-dimensional direction is automatically adjusted. This simplifies the arrangement of the collimator position adjustment means.

(Second Embodiment)

In the first embodiment, two adjacent semiconductor cells sharing a signal electrode form one channel. In the second embodiment, one cell realizes one channel while two adjacent semiconductor cells share one signal electrode.

Figure 21:
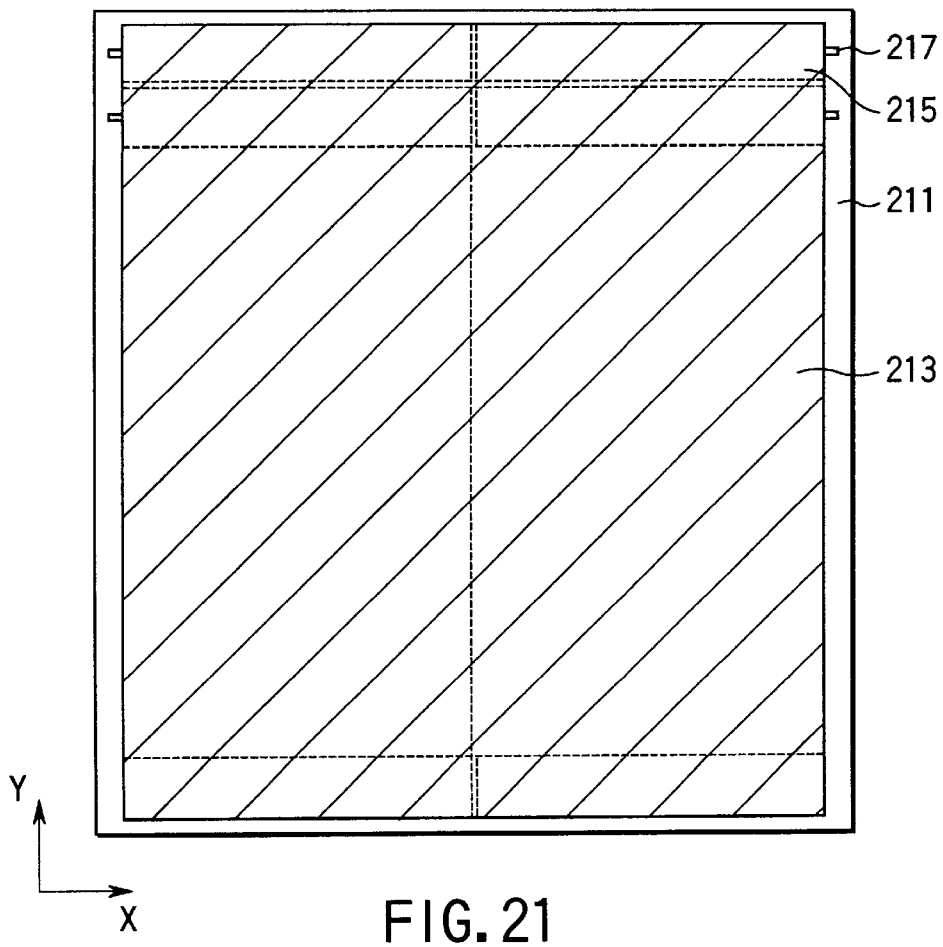
FIG. 21 is a plan view showing a semiconductor gamma ray detector according to the second embodiment.
Figure 22:
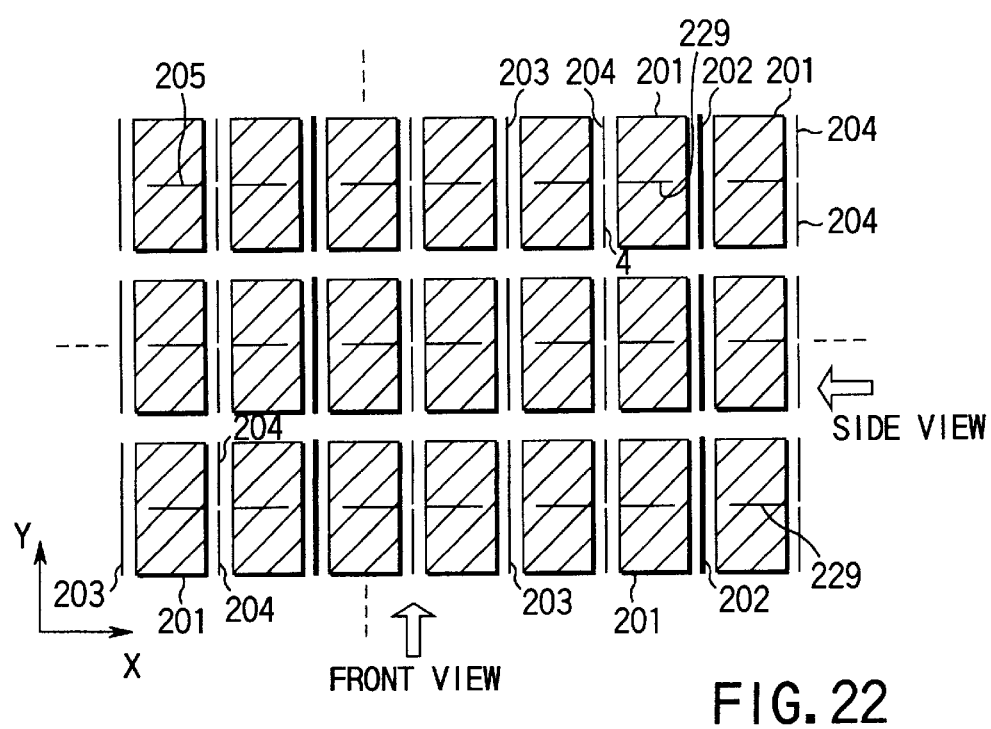
FIG. 22 is a partial plan view showing the cell array in FIG. 21.
Figure 23A:
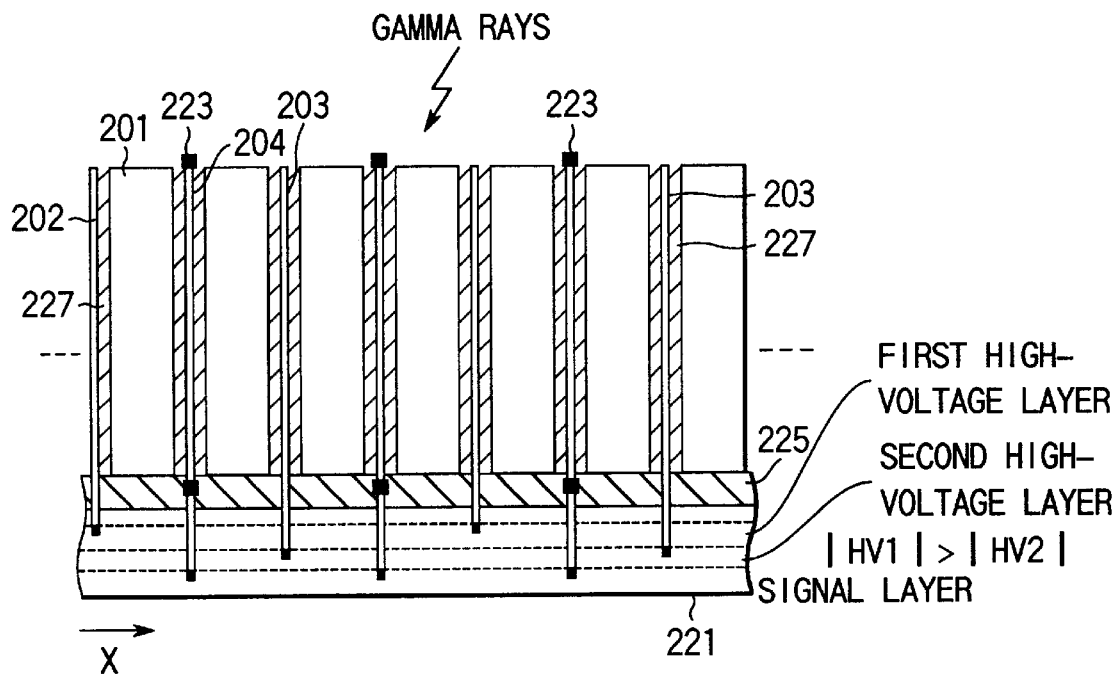
FIG. 23A is a partial sectional view showing the cell array in FIG. 21 in the X direction.
Figure 23B:
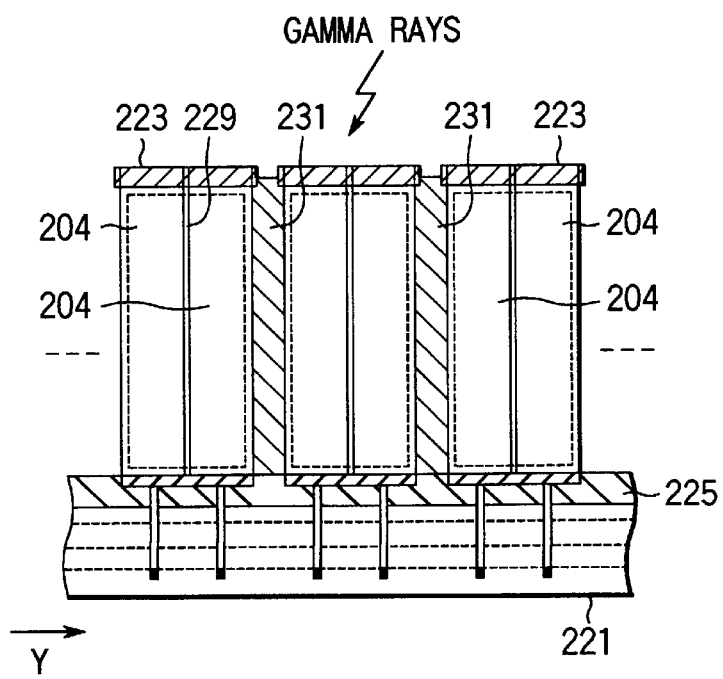
FIG. 23B is a partial sectional view showing the cell array in FIG. 21 in the Y direction.

FIG. 21 is a plan view showing a semiconductor radiation detector according to the second embodiment. FIG. 22 is an enlarged view showing a cell array. FIG. 23A is a front view showing the cell array, and FIG. 23B is a side view showing the cell array. A two-dimensional array of semiconductor cells 201 made of a semiconductor compound such as CdTe (cadmium telluride) which can directly detect a gamma ray radiated from RI in an object to be examined as an electrical signal is formed by mounting a plurality of modules 215 constituting a one-dimensional array of semiconductor cells 201. Reference numeral 213 denotes a collimator; and 217, a module connector.

Common, signal, and common electrodes 202, 204, and 203 are sequentially arranged at intervals between semiconductor cells 201 adjacent in the X direction. Two semiconductor cells 201 adjacent in the X direction share one signal electrode 204. Two semiconductor cells 201 adjacent in the X direction share one common electrode 202 (or 203). The common electrodes 202 and 203 and signal electrode 204 are adhered and electrically connected to the cells 201 with a conductive adhesive 227.

Similar to the first embodiment, the interval between the semiconductor cells 201, i.e., the dead zone where no gamma ray can be detected can be reduced to a width which is equal or smaller than ⅛ the total width of the interval and the gamma ray incidence plane of one semiconductor cell 201, i.e. the total width of the dead zone and the sensible zone, and is equal or smaller than 400 μm.

Figure 24A:
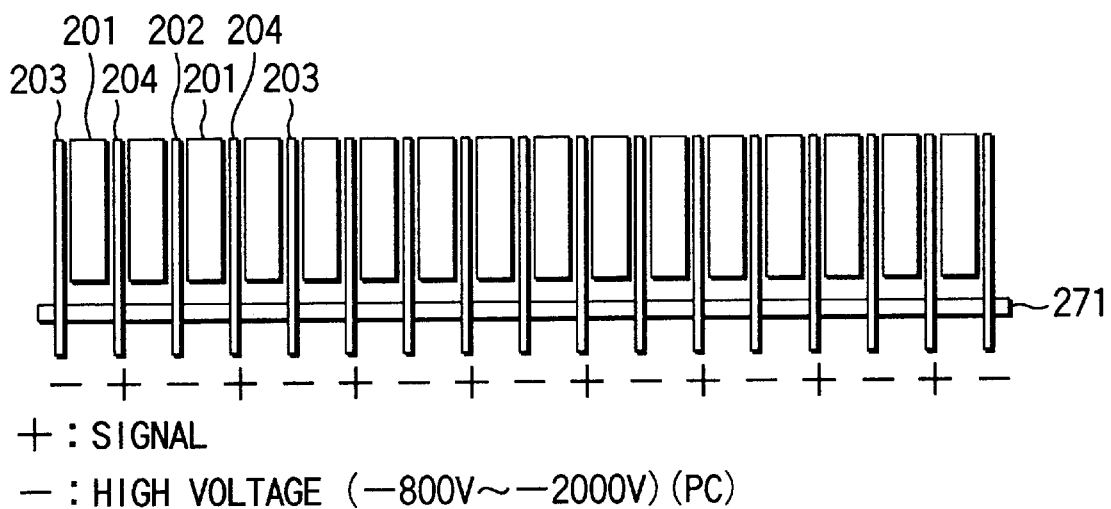
FIG. 24A is a side view showing the layout of the semiconductor cell and signal and common electrodes in the second embodiment.
Figure 24B:
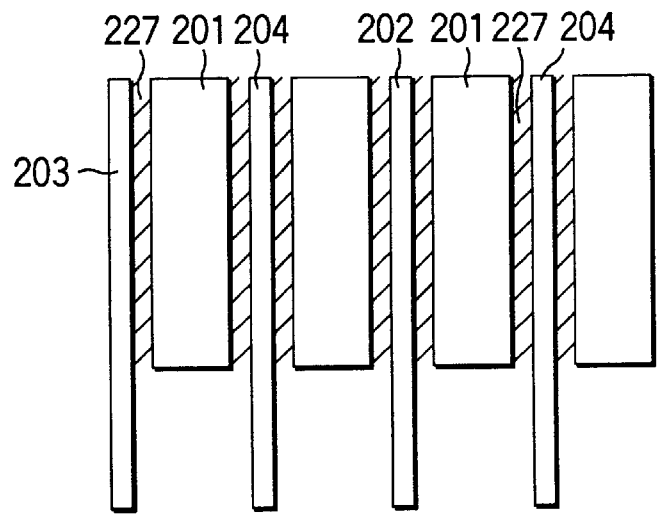
FIG. 24B is a side view showing the detailed layout of the semiconductor cell and signal and common electrodes.

As shown in FIGS. 24A and 24B, the cell 201 is mounted on an alignment substrate 271 in which a plurality of mounting slits are formed in advance. Even with this substrate 271, the alignment intervals between the cell 201 and the electrodes 202, 203, and 204 practically vary. However, the variations can be absorbed by adjusting the thickness of the conductive adhesive 227 for adhering the common electrodes 202 and 203 and signal electrode 204 to the cell 201.

To realize one channel by one cell while the signal electrode 204 is shared by a pair of cells 201, first operating voltage HV1 is applied to one common electrode 202, and a second operating voltage HV2 different from the first operating voltage HV1 is applied to the other common electrode 203. Both the operating voltages HV1 and HV2 are negative voltages and satisfy |HV1|>|HV2|.

The common electrodes 202 and 203 apply different operating voltages to two semiconductor cells 201 sharing the signal electrode 204. That is, the operating voltage HV1 is applied to one of adjacent semiconductor cells 201 sharing the signal electrode 204, and the operating HV2 is applied to the other cell 201. The cell 201 receiving the operating voltage HV1 will be called an A channel, and the cell 201 receiving the operating voltage HV2 will be called a B channel.

This cell array is mounted on a multilayered substrate 221 via an insulating resin 225. The multilayered substrate 221 is formed by stacking an HV1 layer, an HV2 layer, and a signal line layer. The common electrode 202, common electrode 203, and signal electrode 204 are electrically connected to the HV1 layer, HV2 layer, and signal line layer, respectively.

Figure 26A:
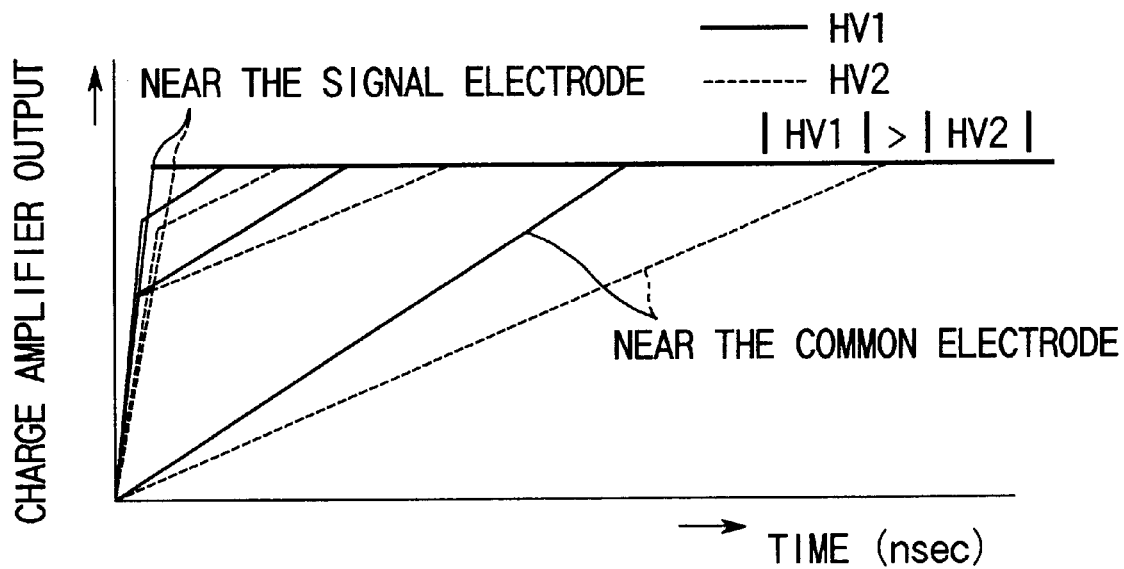
FIGS. 26A and 26B are graphs for explaining the principle of channel determination in the 2-channel/1-cell structure in the second embodiment.
Figure 26B:
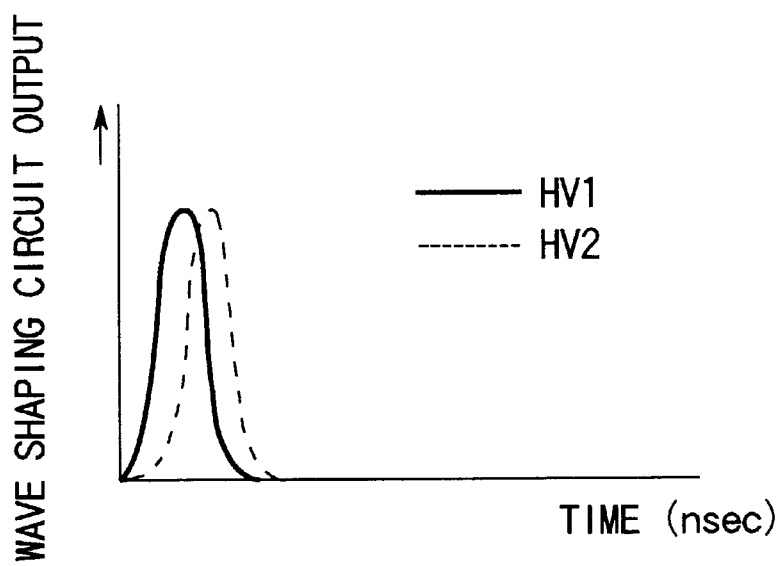
Figure 27:
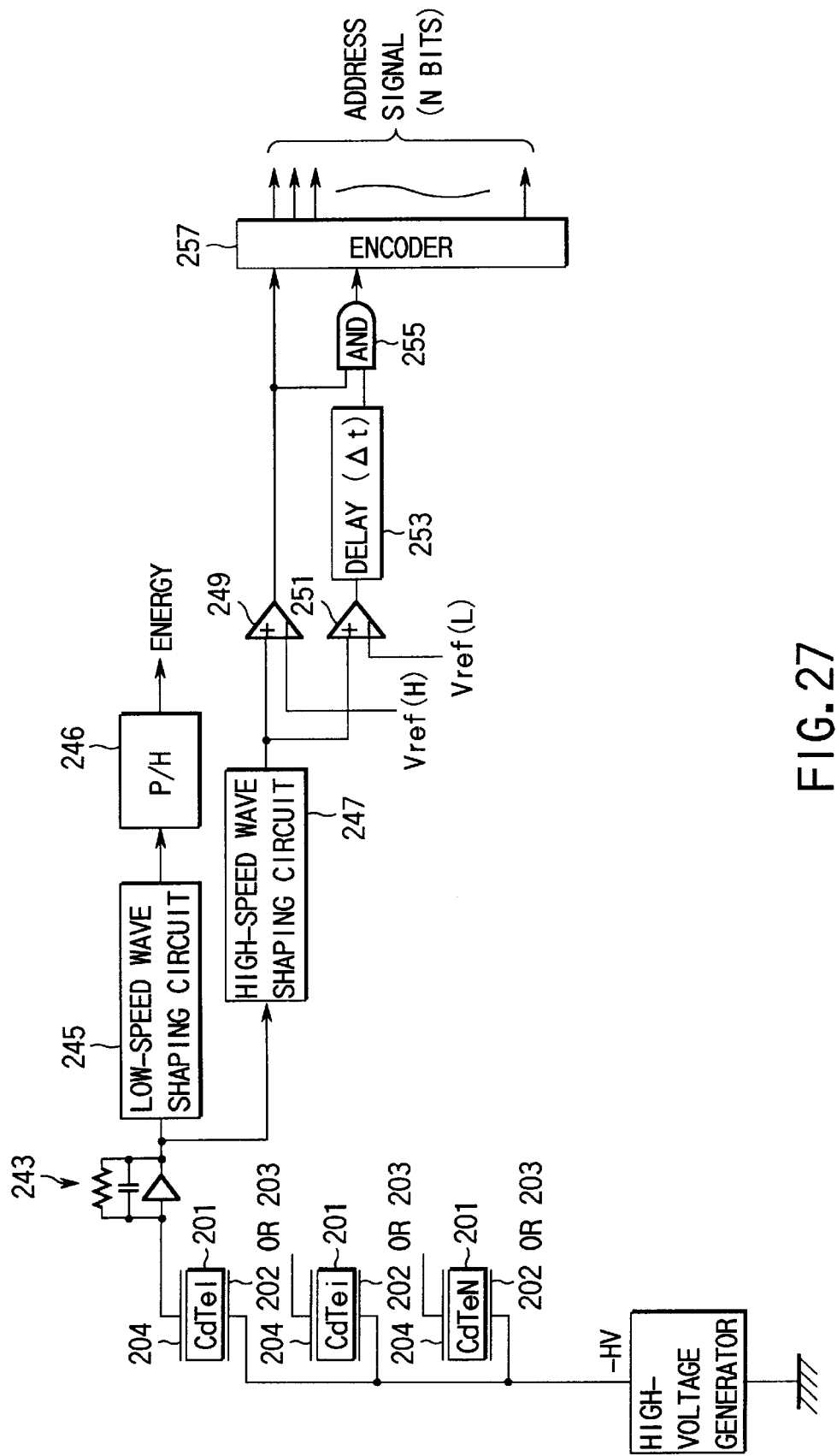
FIG. 27 is a block diagram showing the channel determination circuit in the second embodiment.

As shown in FIGS. 26A and 26B, if the application voltage is different, the time necessary for charge-up of the charge amplifier changes. More specifically, the maximum charge-up time is given by $d^2/(\mu_n \cdot V)$ where V is the potential difference between electrodes, d is the thickness of the semiconductor cell 201 between electrodes, and $\mu_h$ is the hole mobility. To determine by the difference in charge-up time which of adjacent semiconductor cells 201 receives a gamma ray, the output of a charge amplifier 243 is divided into two systems, as shown in FIG. 27. One output is shaped by a low-speed wave shaping circuit 245 in a general manner and extracted as an energy signal from a peak hold circuit (P/H) 246. The other output is shaped by a high-speed wave shaping circuit 247 and compared with two comparison voltages Vref(H) and Vref(L) by comparators 249 and 251. An output from the comparator 249 using the comparison voltage Vref(H) is directly supplied to an AND circuit 255, and an output from the other comparator 251 is supplied to the AND circuit 255 via a delay circuit 253 having a delay time Δt.

Figures 28A, 28B:
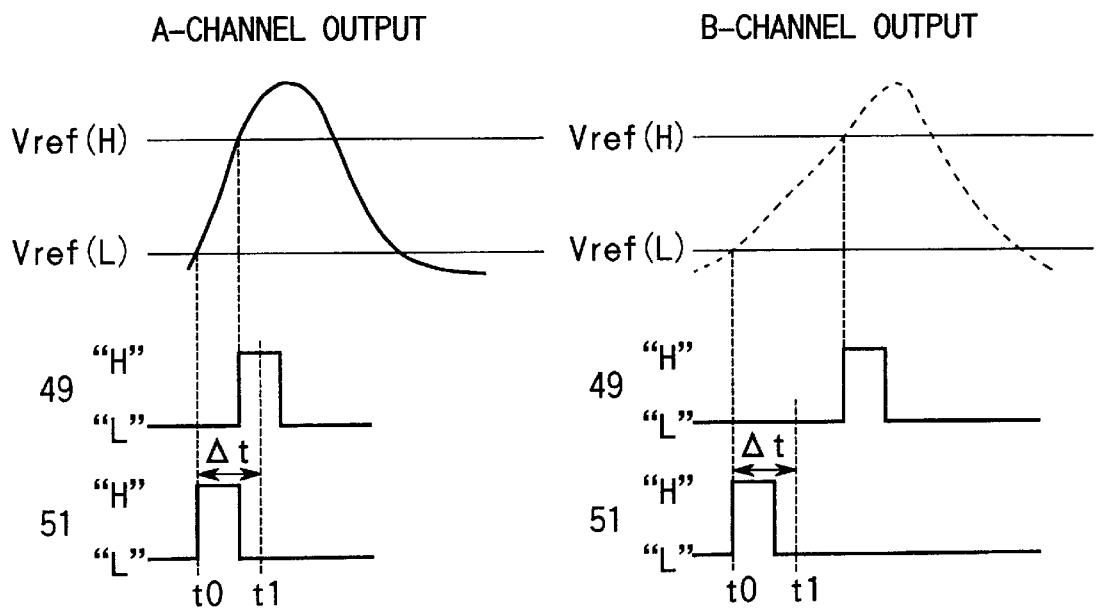
FIG. 28A is a timing chart showing the output waveforms of two comparators in FIG. 27 when gamma rays/charge conversion occurs in the first channel.
FIG. 28B is a timing chart showing the output waveforms of the two comparators in FIG. 27 when gamma rays/charge conversion occurs in the second channel.

FIG. 28A shows the output waveform of the wave shaping circuit 247 and outputs from the comparators 249 and 251 when a gamma ray is incident on the A channel receiving a high application voltage. FIG. 28B shows the output waveform of the wave shaping circuit 247 and outputs from the comparators 249 and 251 when a gamma ray is incident on the B channel receiving a low application voltage. When a gamma ray is incident on the A channel receiving a high application voltage, the charge-up time is relatively short, and the difference in rise time to "H (1)" level between outputs from the comparators 249 and 251 is relatively small. With the delay time Δt, the two input terminals of the AND circuit 255 receive "H"-level signals at time t1, and the AND circuit 255 outputs an "H"-level signal.

To the contrary, when a gamma ray is incident on the B channel receiving a low application voltage, the charge-up time is relatively long, and the difference in rise time to "H (1)" level between outputs from the comparators 249 and 251 is relatively large. Even with the delay time Δt, one of the two input terminals of the AND circuit 255 receives an "H"-level signal at time t1, but the other input terminal receives an "L (0)"-level signal. In this case, the AND circuit 255 outputs an "L"-level signal.

In this way, which of two adjacent cells 201 sharing the signal electrode 204 receives a gamma ray can be determined by the output level of the AND circuit 255. An address indicating an incidence point discriminated as the A or B channel by the output can be output from an encoder 257.

As shown in FIGS. 25A and 25B, the signal electrode 204 of the semiconductor cell 201 is electrically divided into two signal electrode elements 204' by a dielectric isolation layer 229 in the Y direction so as to form two channels by one semiconductor cell 201 in order to increase the spatial resolution. Instead of the dielectric isolation layer 229, a groove 230 may be formed in semiconductor crystals to form a U shape as a whole, and insulation of the signal electrode element 204' may be maintained by the groove 230, as shown in FIG. 25C. The signal electrode 204 is formed on a side having the groove 230, and the common electrode 202 or 203 is formed on a side having no groove 230. This groove 230 may be filled with an insulating resin or may be hollow. The groove 230 can be formed by etching a square semiconductor crystal, thereby realizing a U-shaped semiconductor crystal. Using the semiconductor cell 201 having the groove 230 decreases the number of semiconductor cells mounted in a semiconductor module in accordance with a necessary number of channels, compared to the case of constituting a cell array by separate semiconductor cells 201. The number of module assembly steps can be decreased to increase the manufacturing precision. In FIG. 25C, one groove 230 is formed to divide the signal electrode 204 into two electrode elements 204'. The number of grooves 230 may be increased to increase the number of signal electrode elements 204' and form a plurality of channels per cell as in FIG. 9.

As described above, since the common and signal electrodes are shared by adjacent cells, only one common or signal electrode is sandwiched between adjacent cells. Compared to the conventional detector in which common and signal electrodes and an insulating layer are sandwiched between adjacent cells, the interval between adjacent cells, i.e., the dead zone can be greatly decreased to increase the spatial resolution (cell density) in the X direction.

Further, the spatial resolution in the Y direction can also be increased because the signal electrode is divided into a plurality of signal electrode elements to realize many channels by one cell.

When operating voltages are different for channels, the detection sensitivity may slightly change over time for each channel owing to the difference between operating voltages. To prevent variations in characteristics, relatively high and low voltages are periodically switched to the common electrode 202 in the order of several sec or several ten sec, and relatively low and high voltages opposite to those of the common electrode 202 are periodically switched to the common electrode 203, instead of steadily applying a relatively high or low voltage to the common electrodes 202 and 203.

Figure 29:
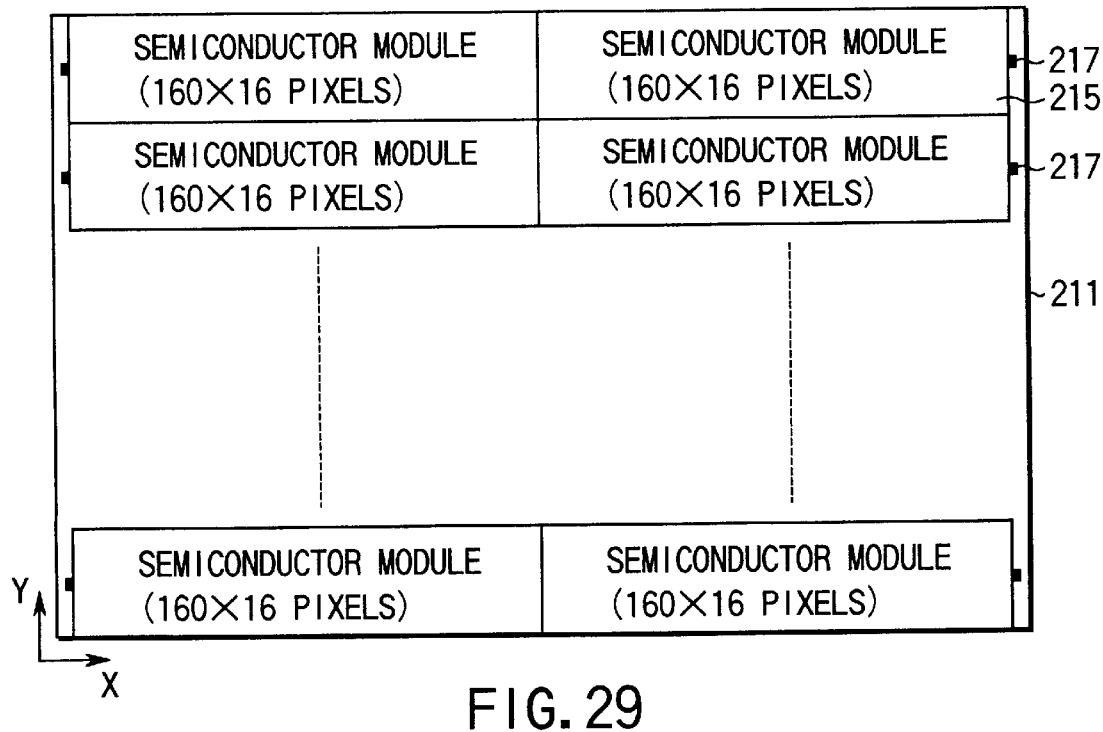
FIG. 29 is a plan view showing the module array in the second embodiment.

A detailed mounting structure of the above two-dimensional array will be described. As shown in FIG. 29, one module 215 is constituted with a matrix size of, e.g., 160×16 cells. Such modules 215 are arrayed in the X and Y directions to form a detector having a larger matrix size.

Figure 31:
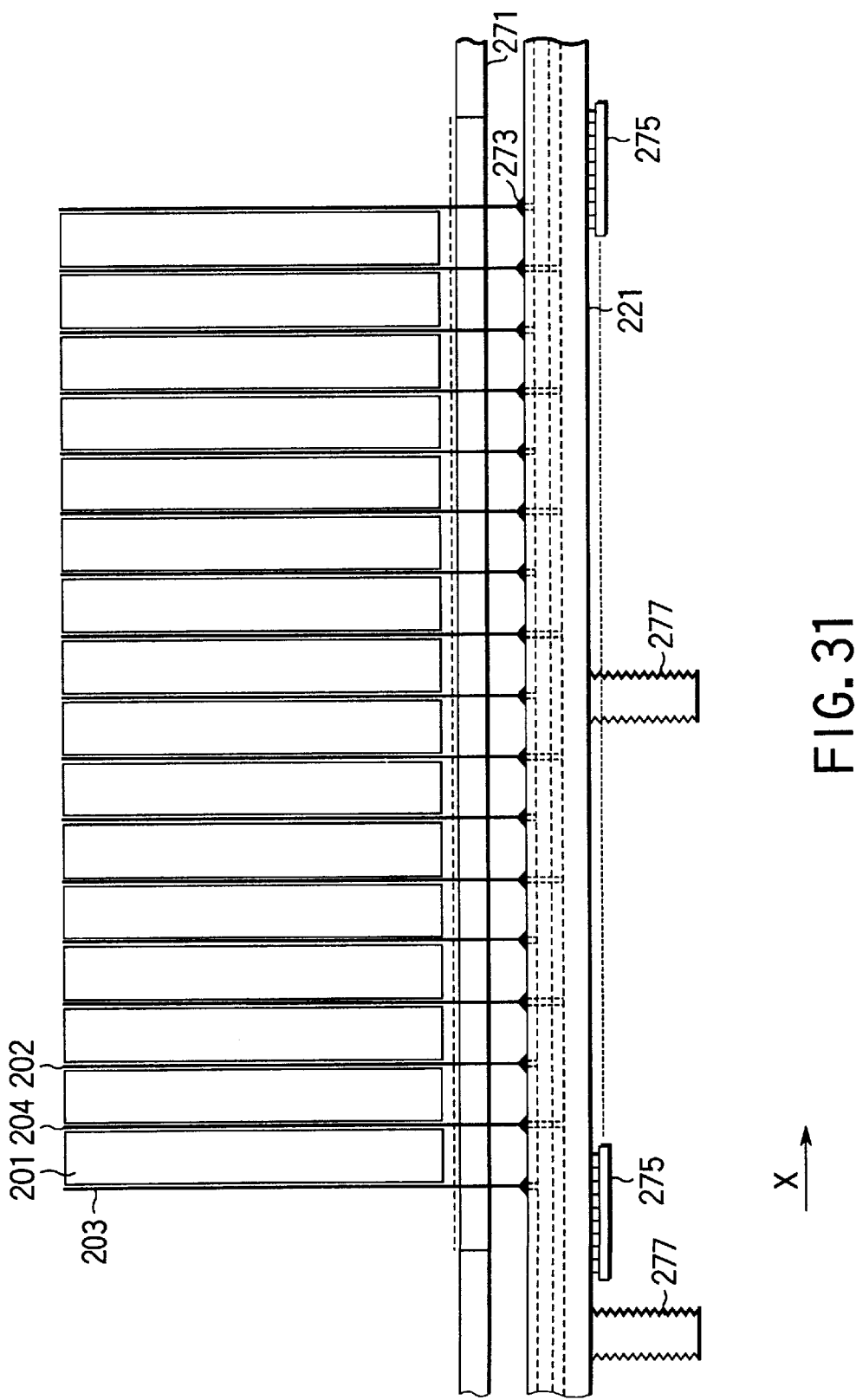
FIG. 31 is a side view showing one module in FIG. 30A.
Figure 32:
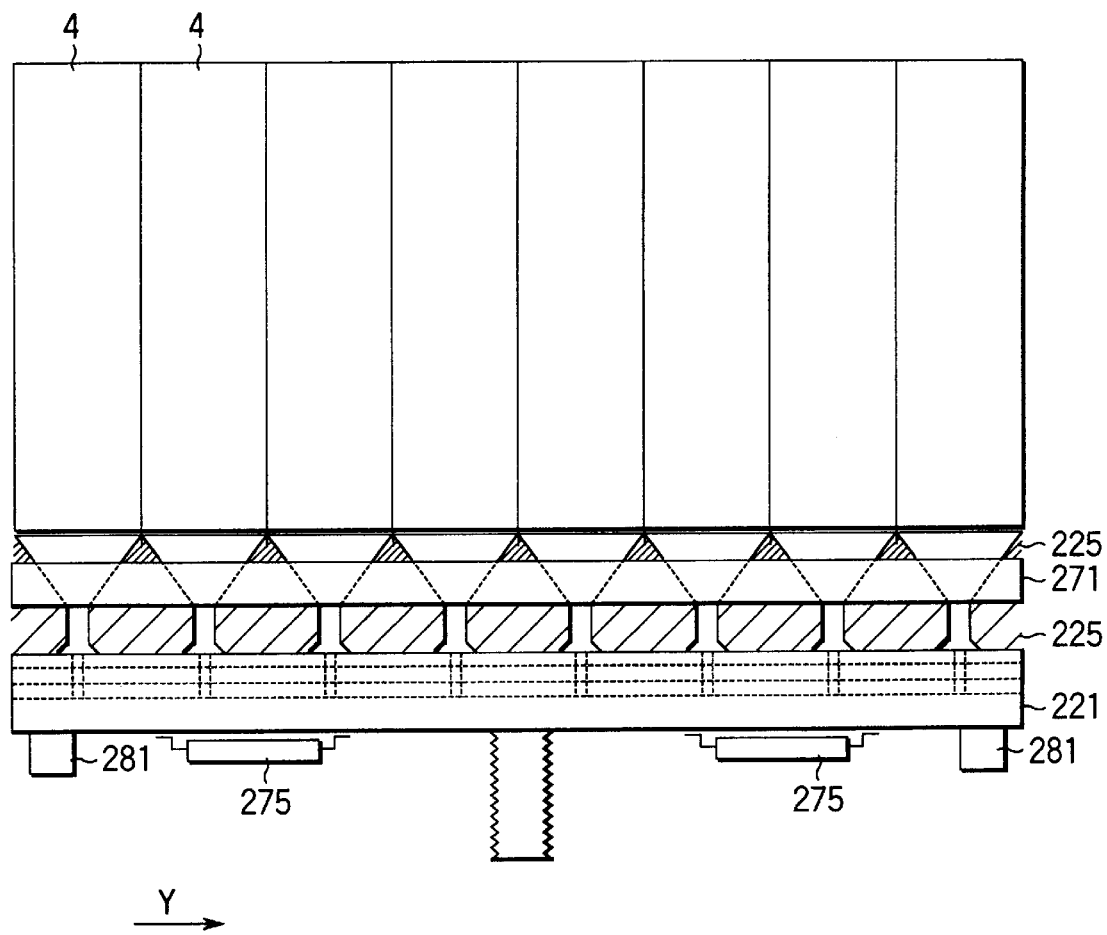
FIG. 32 is a front view showing one module in FIG. 30A.

FIG. 30A is a top view of one cell array module 215 when viewed from the gamma ray incidence direction, and FIG. 30B is a front view of the module 215. FIGS. 31 and 32 are a front view and a side view, respectively, showing the mounting state on the multilayered substrate 221. The cells 201 regularly arrayed on the substrate 271 are mounted on the surface of the multilayered substrate 221 with low-temperature solders 273. A charge amplifier array 275 is mounted on the rear surface of the multilayered substrate 221. The multilayered substrate 221 is supported by a heat pipe 277 also serving as a support column.

Figure 33:
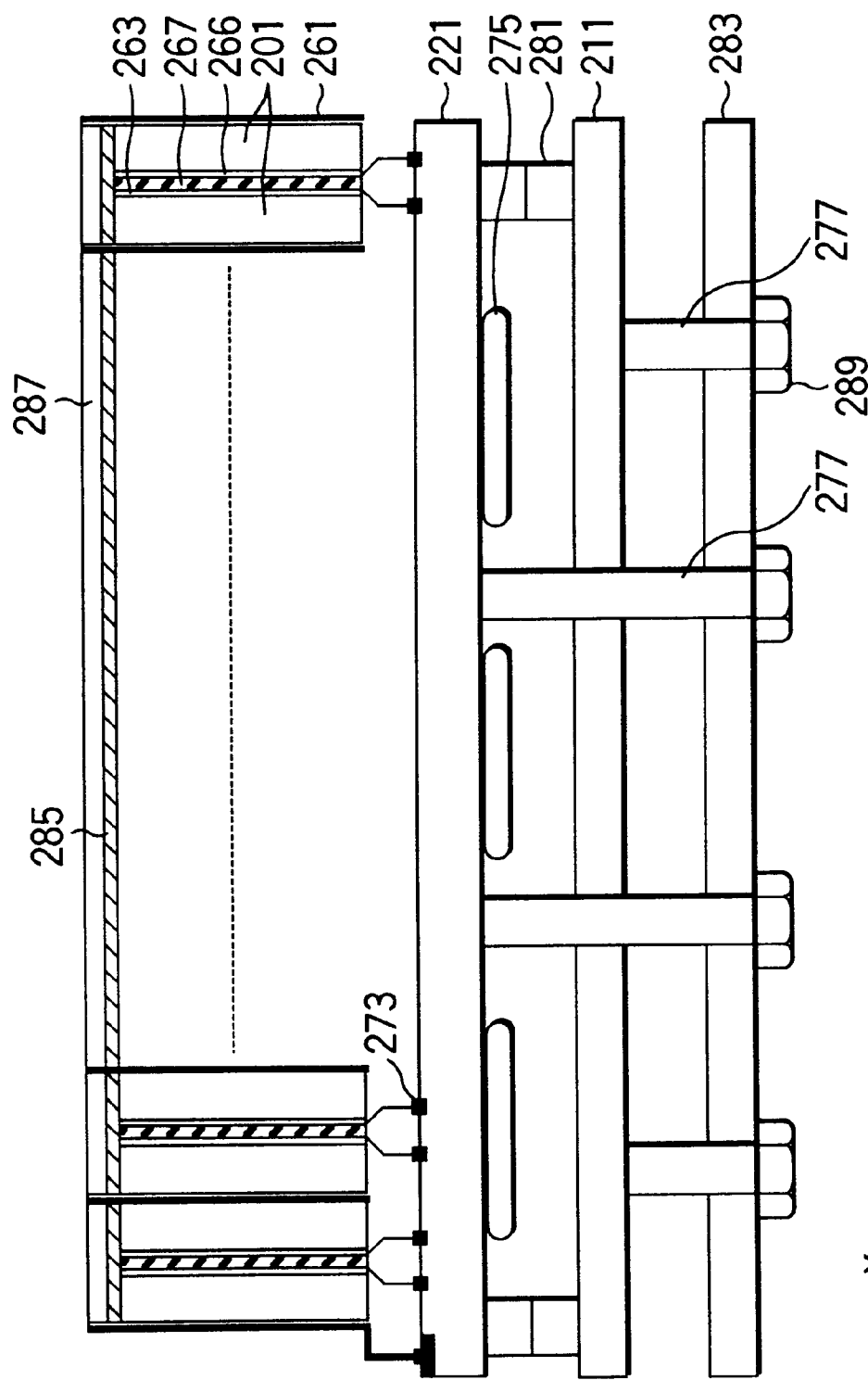
FIG. 33 is a front view showing the lower structure of the cell array in the second embodiment.
Figure 34:
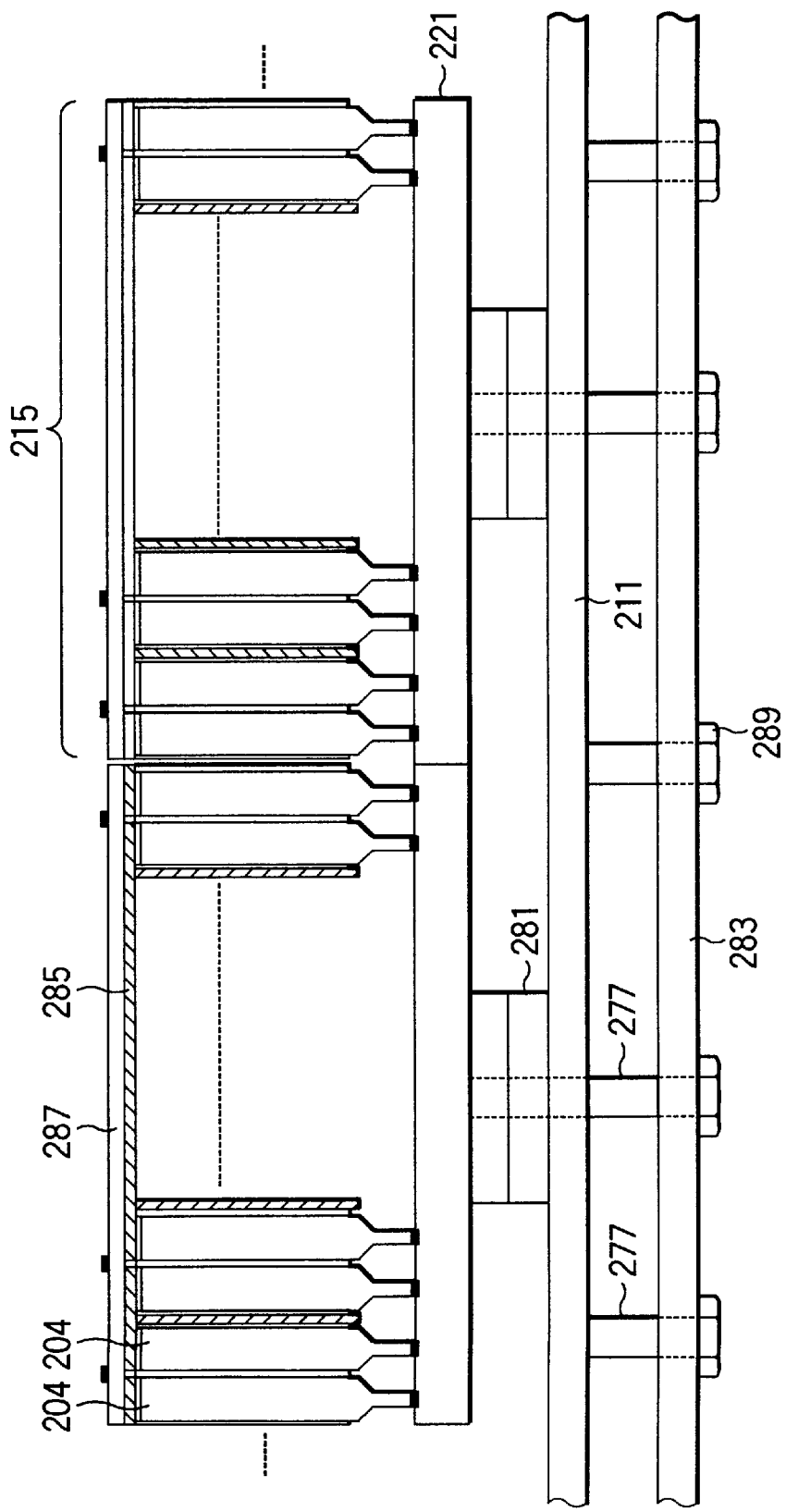
FIG. 34 is a side view showing the lower structure of the cell array in the second embodiment.

FIGS. 33 and 34 are a front view and a side view, respectively, showing the lower structure of the multilayered substrate 221. The output terminal of the multilayered substrate 221 is extracted to a motherboard 211 via a connector 281. The heat pipe 277 extends through the motherboard 211 and is fixed with a nut 289 to a cooling plate 283 made of, e.g., copper having a large heat capacity on which a cooling mechanism such as a cooling fan is mounted.

As shown in FIGS. 33 and 34, an operating voltage line board 287 may be formed on the surface of the cell array via an insulating layer 285.

Figure 35A:
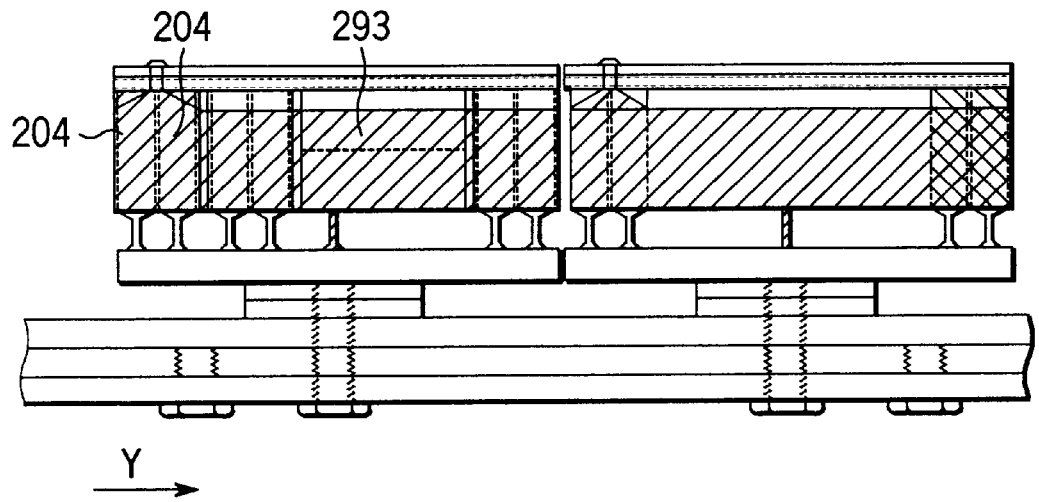
FIGS. 35A and 35B are side views, respectively, showing common electrodes coupled in the Y direction.
Figure 35B:
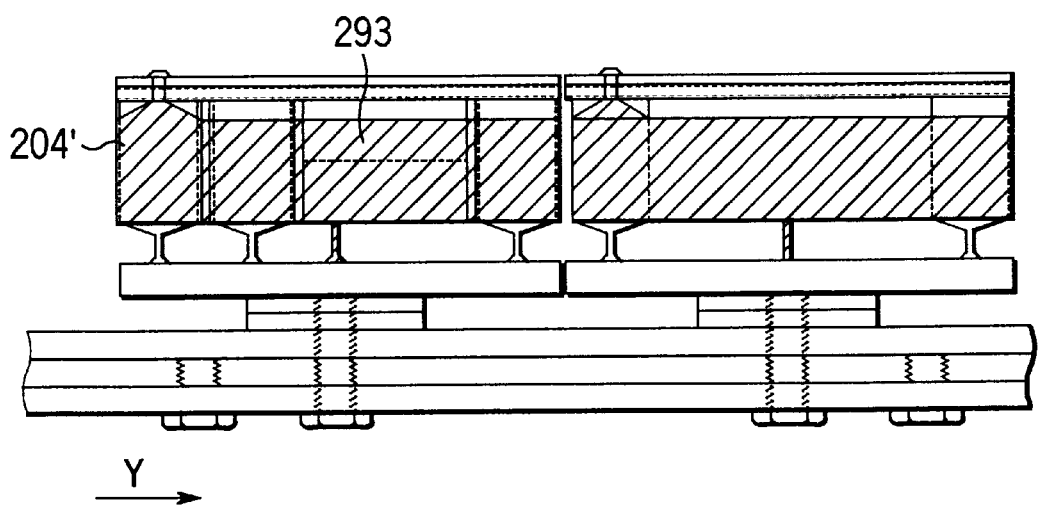

Further, as shown in FIGS. 35A and 35B, common electrodes 293 may be coupled in the Y direction within the module.

(Third Embodiment)

In the first and second embodiments, the signal electrode in addition to the common electrode is shared by two cells adjacent in the X direction. In the third embodiment, only the common electrode is shared by two cells adjacent in the X direction, and the signal electrode is arranged for each cell without being shared. This realizes one channel by one cell or many channels by one cell.

Figure 36A:
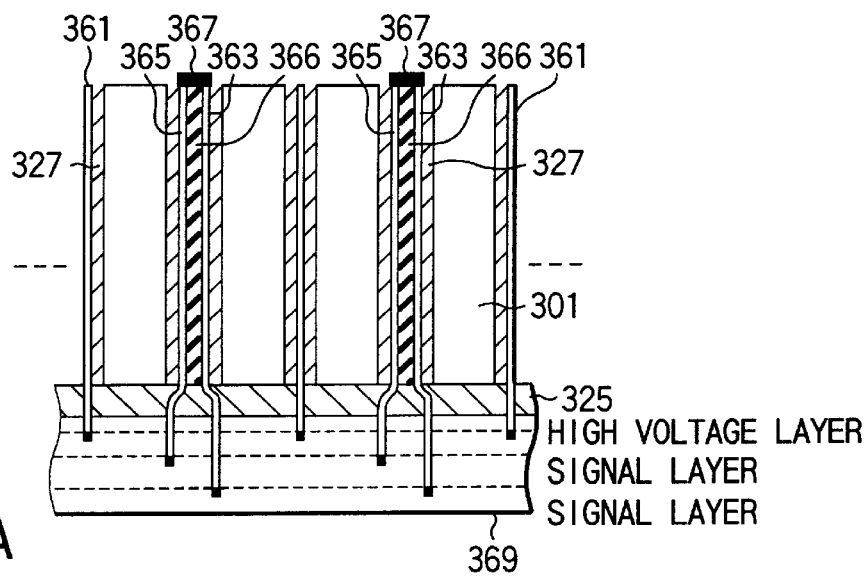
FIG. 36A is a partial sectional view showing the cell array of a semiconductor gamma ray detector according to the third embodiment.
Figure 36B:
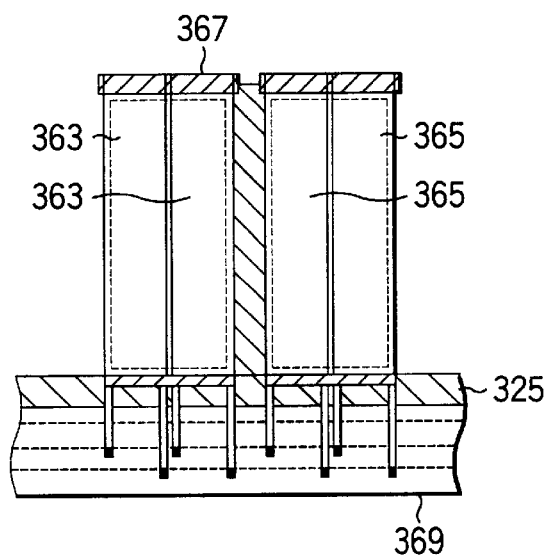
FIG. 36B is a partial side view showing the cell array of the semiconductor gamma ray detector according to the third embodiment.

As shown in FIGS. 36A and 36B, a common electrode 361 is shared by two cells 301 adjacent in the X direction, and signal electrodes 363 and 365 are individually arranged on the cells 301. Signal currents from the signal electrodes 363 and 365 are separately extracted from a substrate 369 via different layers.

Even when only the common electrode is shared by two adjacent cells, the spatial resolution becomes higher than in the conventional detector in which signal and common electrodes are individually arranged on cells. The interval between the semiconductor cells 301, i.e., the dead zone where no gamma ray can be detected can be reduced to a width which is equal or smaller than ⅛ the width of the gamma ray incidence plane of one semiconductor cell 301, i.e. the width of the sensible zone, and is equal or smaller than 400 µm.

A pair of signal electrodes 363 and 365 on opposite sides are coupled by an insulating coupling member 367 via an insulating layer 366. With this structure, the insulated state between the signal electrodes 363 and 365 can be maintained.

Figure 36C:
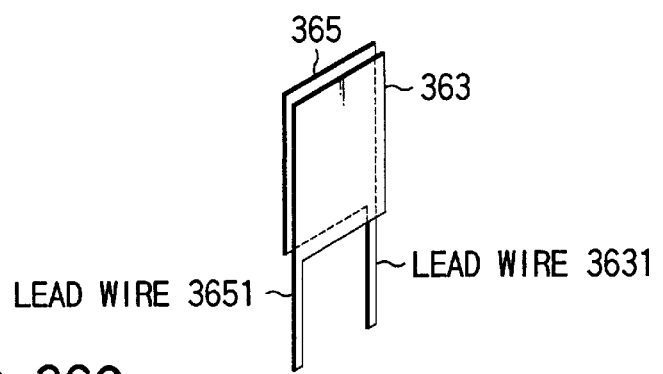
FIG. 36C is a view showing the positional relationship between signal and common electrode lead wires in FIG. 36B.

As shown in FIGS. 36A and 36C, lead wires 3631 and 3651 from the signal electrodes 363 and 365 are bent in directions in which these wires are apart from each other, and extend from different sides, thereby reducing coupling between the electrodes. In this case, to increase the assembly efficiency of a total of four electrodes, i.e., two signal electrodes 363 and 365 and two common electrodes 361, the mechanical precision is preferably ensured by the insulating coupling member 367 before semiconductor cells are mounted. According to this method, the same operating voltage can be applied to adjacent cells 301 because the signal electrodes are separately arranged.

Since the signal electrodes are adjacent to each other, signals from the signal electrodes are hardly influenced by noise owing to the operating voltage of the common electrode to obtain a signal having a high S/N ratio, compared to the arrangement in which the signal and common electrodes are adjacent to each other. Since a signal is hardly influenced by noise, the interval between the electrodes can be decreased.

(Fourth Embodiment)

Figure 37A:
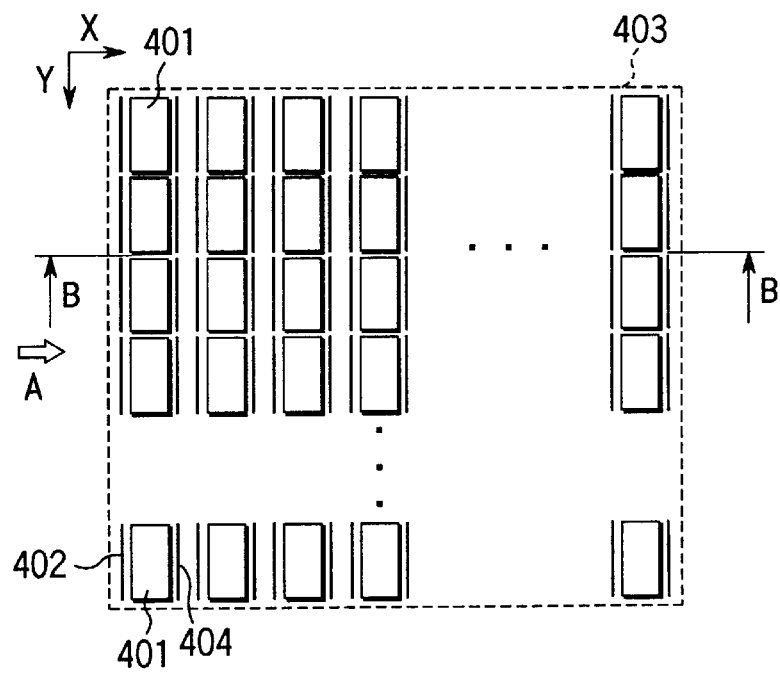
FIG. 37A is a plan view showing a semiconductor gamma ray detector according to the fourth embodiment.
Figure 37B:
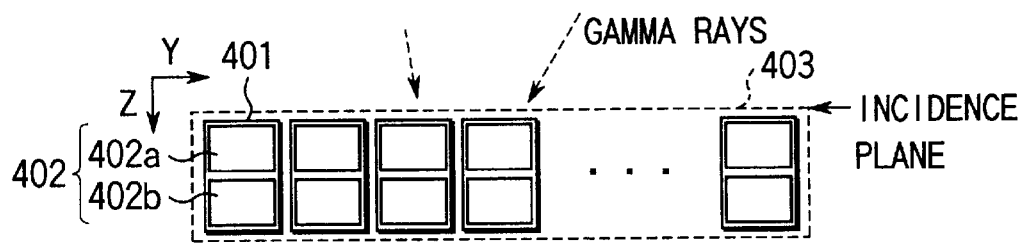
FIG. 37B is a side view showing the semiconductor gamma ray detector in FIG. 37A.
Figure 37C:
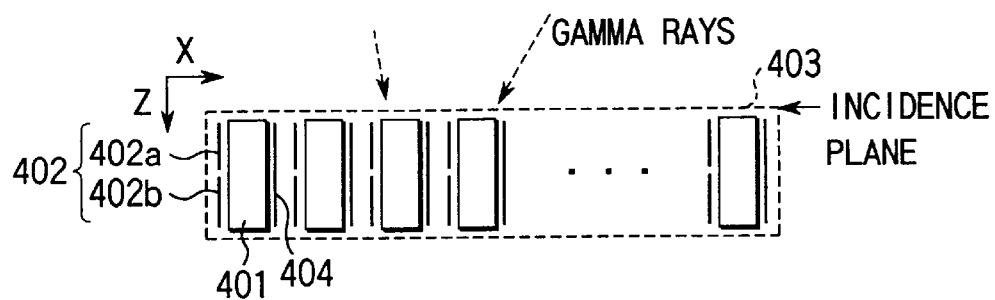
FIG. 37C is a sectional view taken along the line B—B in FIG. 37A.

As shown in FIGS. 37A, 37B, and 37C, a common electrode 402 is divided into two common electrode elements 402a and 402b in the Z direction, i.e., the direction of depth perpendicular to the gamma ray incidence plane. By dividing the common electrode 402 in the direction of depth, gamma rays/charge conversion can be determined to occur in an upper channel between a signal electrode 404 and the upper common electrode 402a or a lower channel between the signal electrode 404 and the lower common electrode 402b. The gamma ray position measurement precision can therefore increase.

The signal electrodes 404 are individually arranged for respective semiconductor cells 401. A signal generated in the upper channel and a signal generated in the lower channel are output from the same signal electrode 404. This requires an implementation of determining one of the upper and lower channels in which gamma rays/charge conversion occurs.

Figure 38:
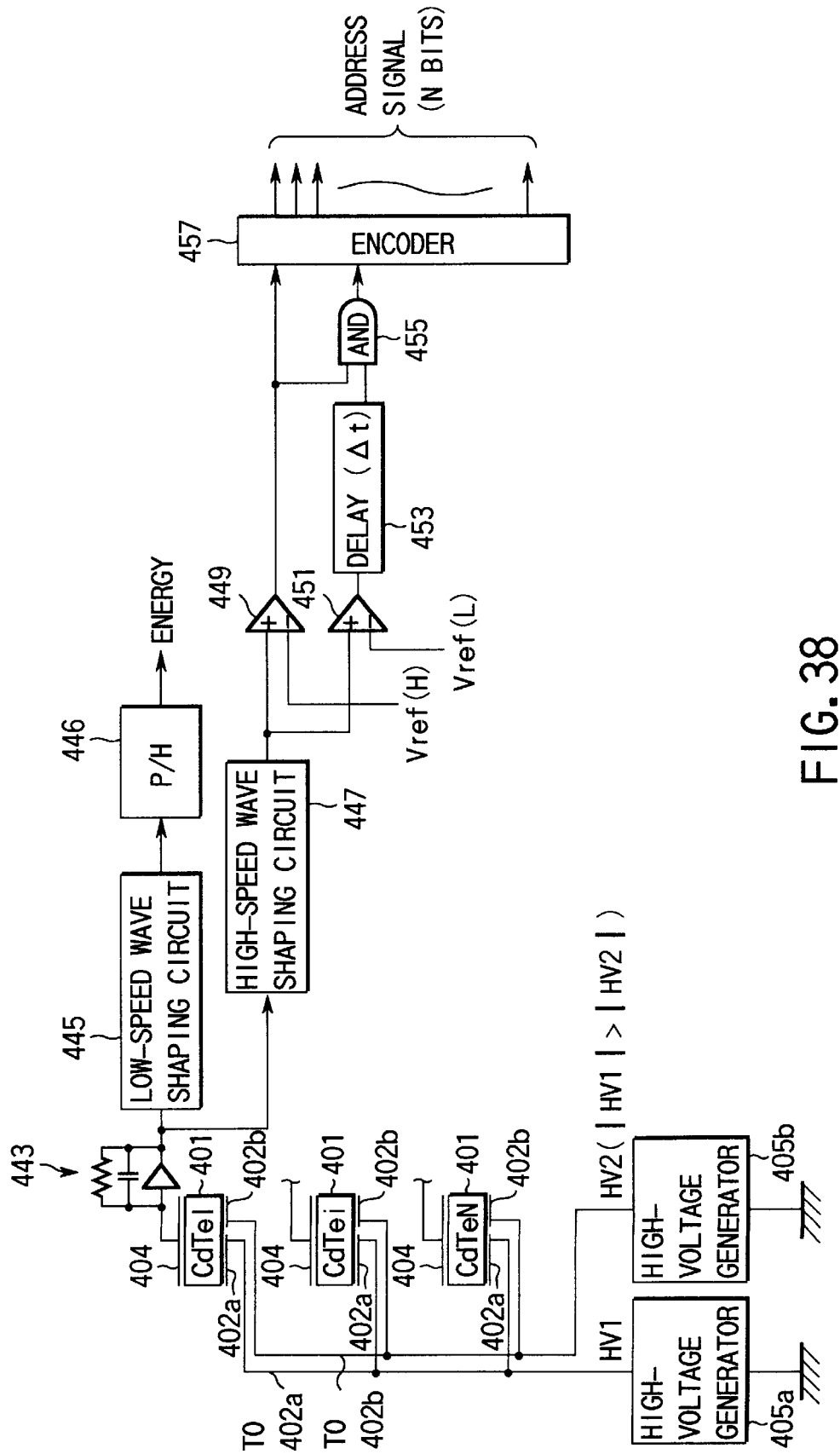
FIG. 38 is a block diagram showing the channel determination circuit in the fourth embodiment.
Figure 39A:
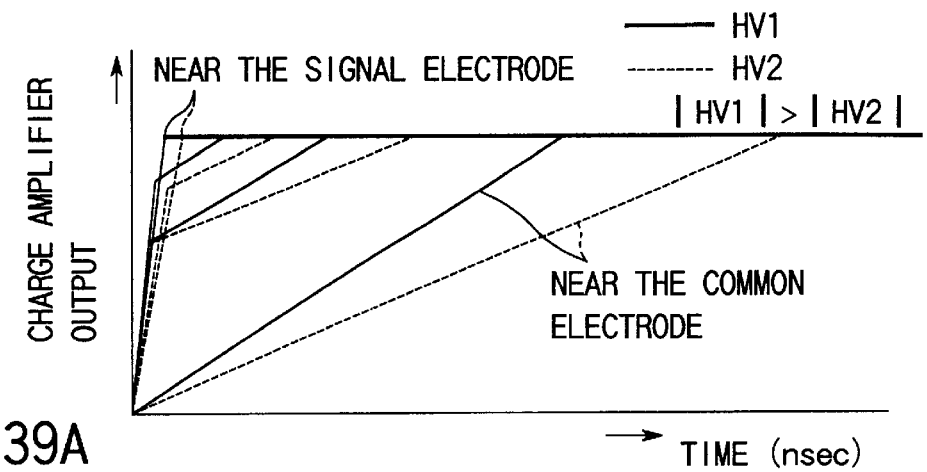
FIGS. 39A and 39B are graphs for explaining the determination principle of the channel determination circuit in FIG. 38.

As this implementation, as shown in FIG. 38, a first operating voltage (negative voltage) HV1 is applied from an operating voltage generator 405a to the upper common electrode element 402a, whereas a second operating voltage (negative voltage) HV2 different from HV1 and lower in absolute value than HV1 is applied from an operating voltage generator 405b to the lower common electrode element 402b. By changing the potential difference between electrodes with different application voltages, the time necessary for charge-up of a charge amplifier 443, i.e., the rise characteristic (rise time) of an output from the charge amplifier 443 changes, as shown in FIG. 39A. This is because the maximum charge-up time is given by $d^2/(\mu_h \cdot V)$ where V is the potential difference between electrodes, d is the thickness of the semiconductor cell 401 between electrodes, and $\mu_h$ is the hole mobility.

Figure 39B:
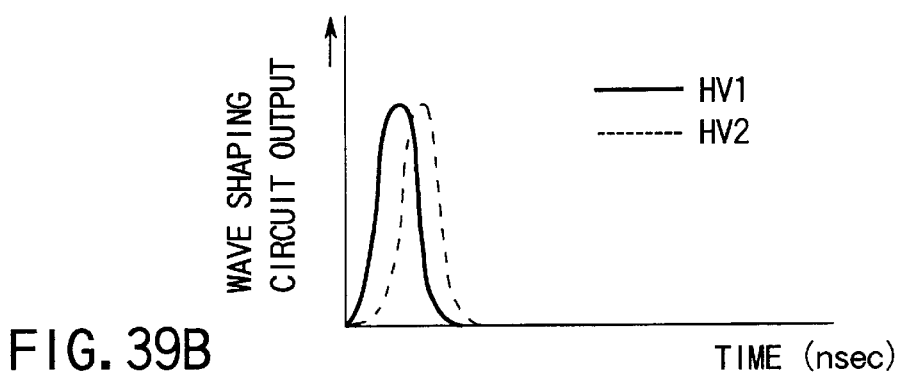

The difference in rise characteristics of an output from the charge amplifier 443 is reflected on the output waveform of a high-speed wave shaping circuit 447 on the output stage of the charge amplifier 443, as shown in FIG. 39B. A low-speed wave shaping circuit 445 for generating an energy signal in cooperation with a peak hold circuit (P/H) 446 is arranged parallel to the high-speed wave shaping circuit 447 on the output stage of the charge amplifier 443. The two circuits 447 and 445 have different wave shaping speeds to prevent the output timing of a gamma rays/charge conversion point (X,Y,Z) from an encoder 457 subsequent to the high-speed wave shaping circuit 447 from excessively delaying from the output (peak hold start) timing of an energy signal from the peak hold circuit 446.

Figures 40A, 40B:
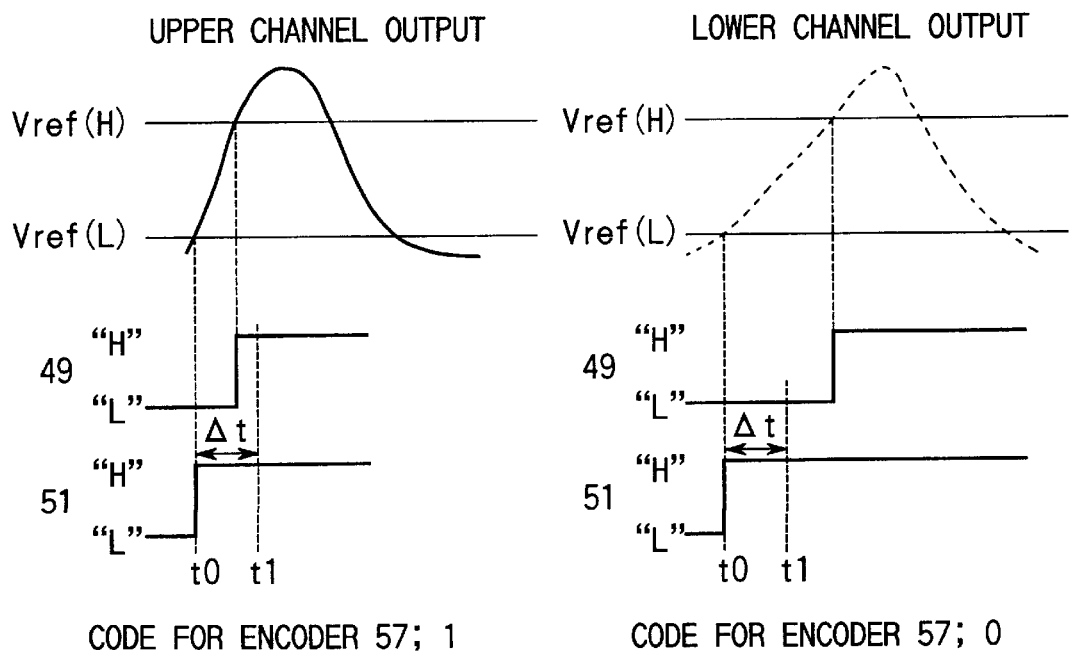
FIG. 40A is a waveform chart showing the output waveforms of two comparators in FIG. 38 when gamma rays/charge conversion occurs in the first channel.
FIG. 40B is a waveform chart showing the output waveforms of the two comparators in FIG. 38 when gamma rays/charge conversion occurs in the second channel.

An output from the high-speed wave shaping circuit 447 is supplied to two comparators 449 and 451. The comparators 449 and 451 receive different reference voltages. In this case, a reference voltage Vref(H) applied to one comparator 449 is set higher than a reference voltage Vref(L) applied to the other comparator 451. FIG. 40A shows the output patterns of the comparators 449 and 451 when gamma rays/charge conversion occurs in the upper channel having a large potential difference between electrodes. FIG. 40B shows the output patterns of the comparators 449 and 451 when gamma rays/charge conversion occurs in the lower channel having a small potential difference between electrodes. Outputs from the comparators 449 and 451 rise from "Low (0)" to "High (1)" when the output voltage of the high-speed wave shaping circuit 447 becomes higher than the respective reference voltages.

An output from one comparator 449 is supplied to both the encoder 457 and an AND circuit 455, and an output from the other comparator 451 is delayed by a delay circuit 453 (delay time Δt) and supplied to the AND circuit 455. The delay time Δt is set to input (1,1) to the AND circuit 455 and output "1" when gamma rays/charge conversion occurs in the upper channel having a high rise speed, and to input (0,1) to the AND circuit 455 and output "0" when gamma rays/charge conversion occurs in the lower channel having a low rise speed.

One of the upper and lower channels in which gamma rays/charge conversion occurs can be determined by the output level of the AND circuit 455. Thus, an address code representing by outputs from the AND circuit 455 and comparator 449 one of the upper and lower channels of the semiconductor in which cell gamma rays/charge conversion occurs, i.e., representing a semiconductor cell (XY point) and depth (Z point) where gamma rays/charge conversion occurs can be output from the encoder 457.

Figure 1A:
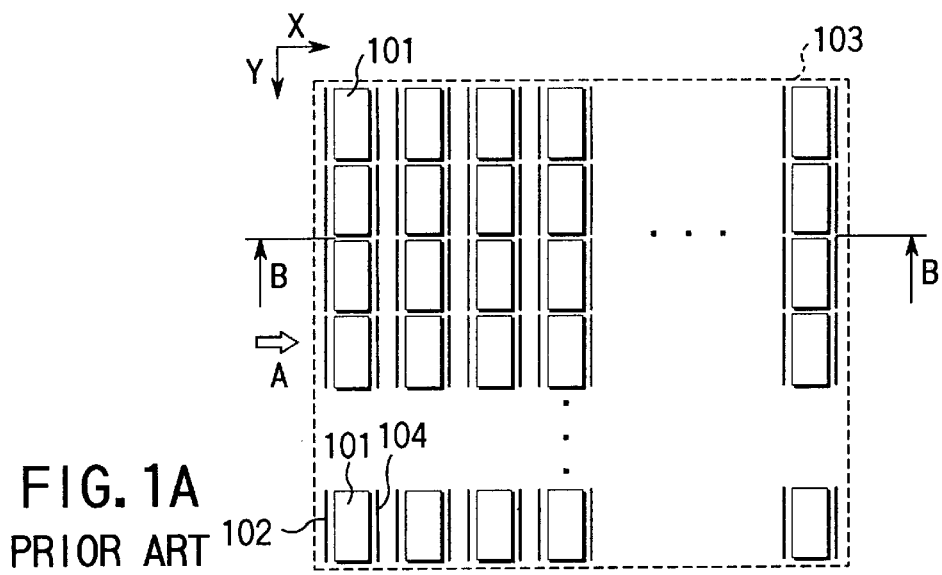
FIG. 1A is a plan view showing a conventional vertical semiconductor gamma ray detector.
Figure 1B:
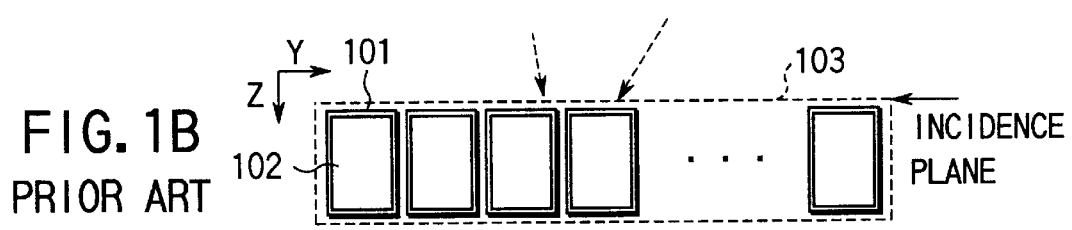
FIG. 1B is a side view showing the conventional semiconductor gamma ray detector.
Figure 1C:
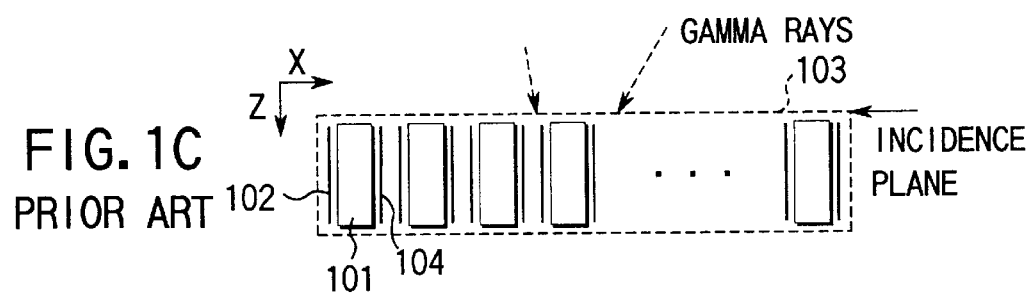
FIG. 1C is a sectional view taken along the line B—B in FIG. 1A.
Figure 2:
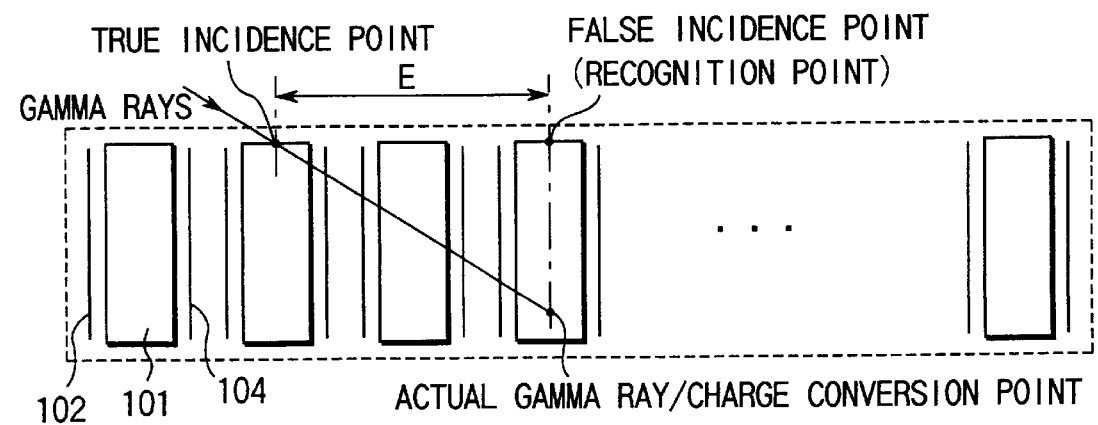
FIG. 2 is a view showing an error of the gamma ray incidence point in the conventional vertical semiconductor gamma ray detector.
Figure 41:
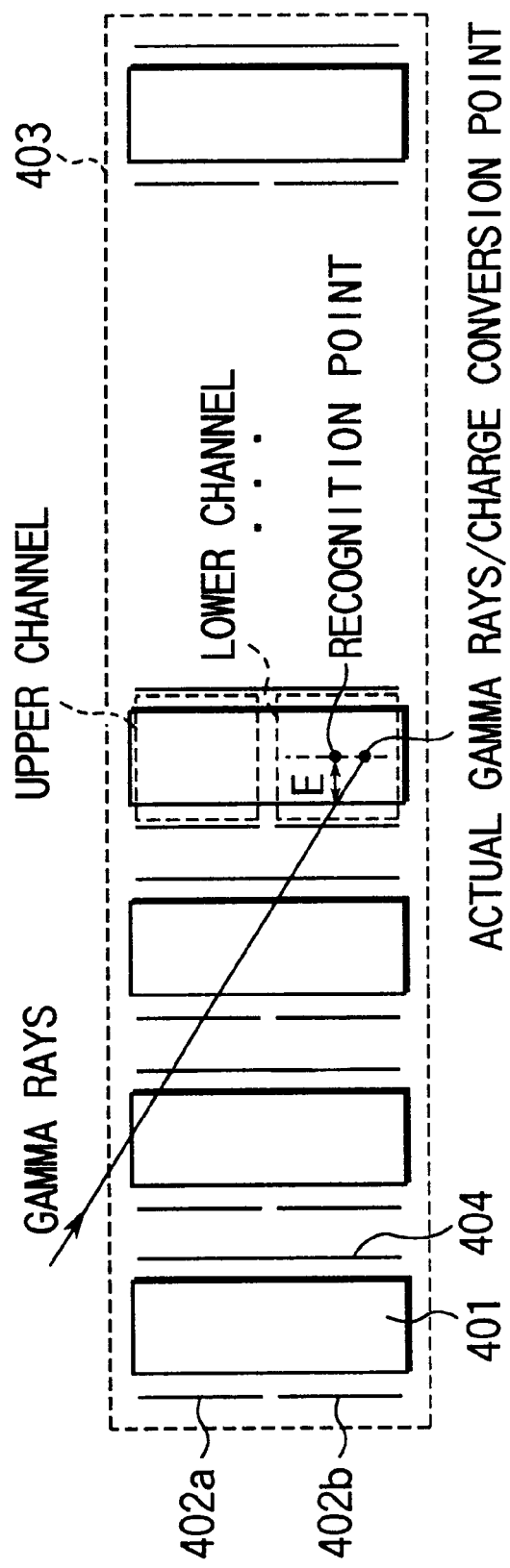
FIG. 41 is a view showing the principle of increasing the point recognition precision in the fourth embodiment.

In practice, the gamma rays/charge conversion point is recognized as the central point of the upper or lower channel, as shown in FIG. 41. When a gamma ray is incident at a large incidence angle, the recognition point may include a slight error E. However, this error is much smaller than in the conventional detector in which the gamma rays/charge conversion point is recognized as an incidence point (see FIG. 2).

According to the fourth embodiment, since the common electrode is divided into a plurality of electrode elements in the Z direction (the direction of depth), an electrode element and depth where gamma rays/charge conversion occurs can be recognized. That is, the gamma ray position is recognized as not an incidence point (X,Y), unlike the conventional detector, but a gamma rays/charge conversion point (X,Y,Z). An error between actual and recognition points becomes much smaller than in the conventional detector, and the spatial resolution and reliability of a reconstructed image can increase. This effect can be enhanced by increasing the common electrode divisional number.

Since the upper and lower channels receive different voltages, the detection sensitivity may greatly vary between the channels after long-time use. To prevent variations in sensitivity, the operating voltage generators 405a and 405b periodically switch the application voltages every time the operating time reaches a predetermined time in the order of several sec or several ten sec, i.e., switch the application voltages of the upper and lower common electrode elements 402a and 402b to low and operating voltages and return them to operating and low voltages in the next cycle, instead of always applying operating and low voltages to the upper and lower common electrode elements 402a and 402b, respectively.

To prevent crosstalk between common electrode elements, a groove may be formed in a cell between the common electrode elements and filled with an insulator, or an insulating layer may be formed by ion implantation.

If the common electrode element is shared by semiconductor cells adjacent in the X direction, a semiconductor cell array can be easily mounted, and the semiconductor cell density can increase. A plurality of semiconductor cells each having one common electrode and one signal electrode may be arrayed in the Z direction to extract signals from these semiconductor cells. The gamma incidence plane (X-Y plane) may be curved.

Figure 42A:
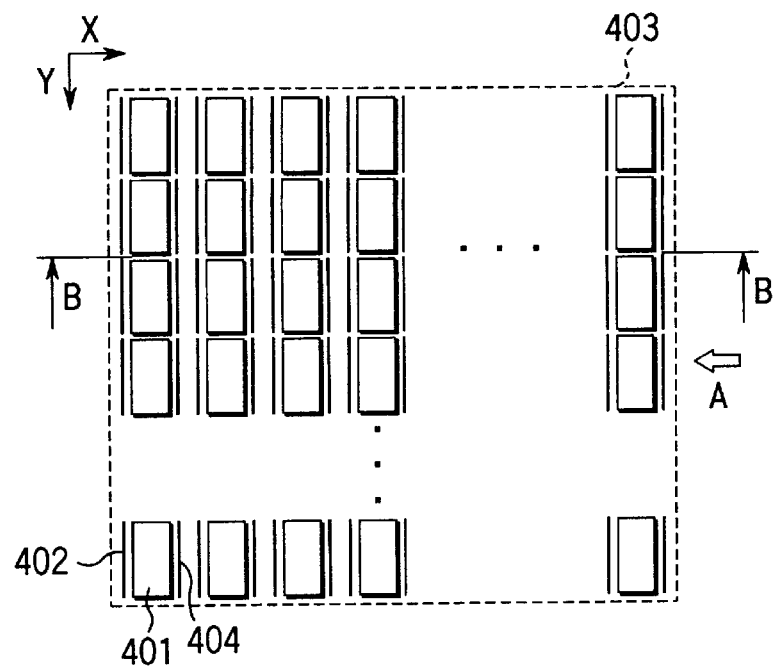
FIG. 42A is a plan view showing a semiconductor gamma ray detector according to the fifth embodiment.
Figure 42B:
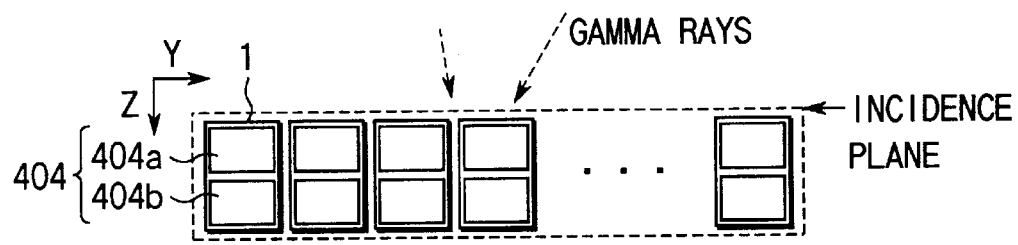
FIG. 42B is a side view showing the semiconductor gamma ray detector in FIG. 42A.
Figure 42C:
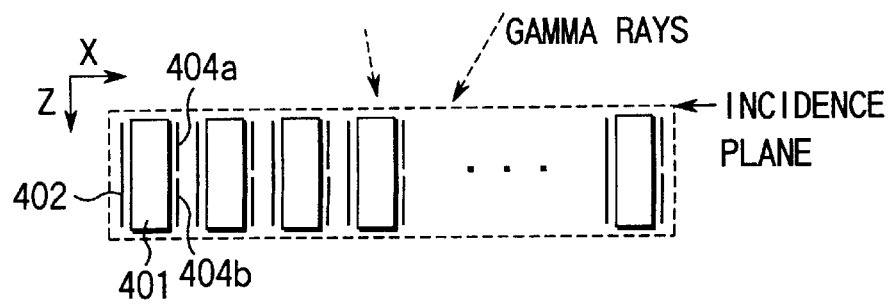
FIG. 42C is a sectional view taken along the line B—B in FIG. 42A.
Figure 43:
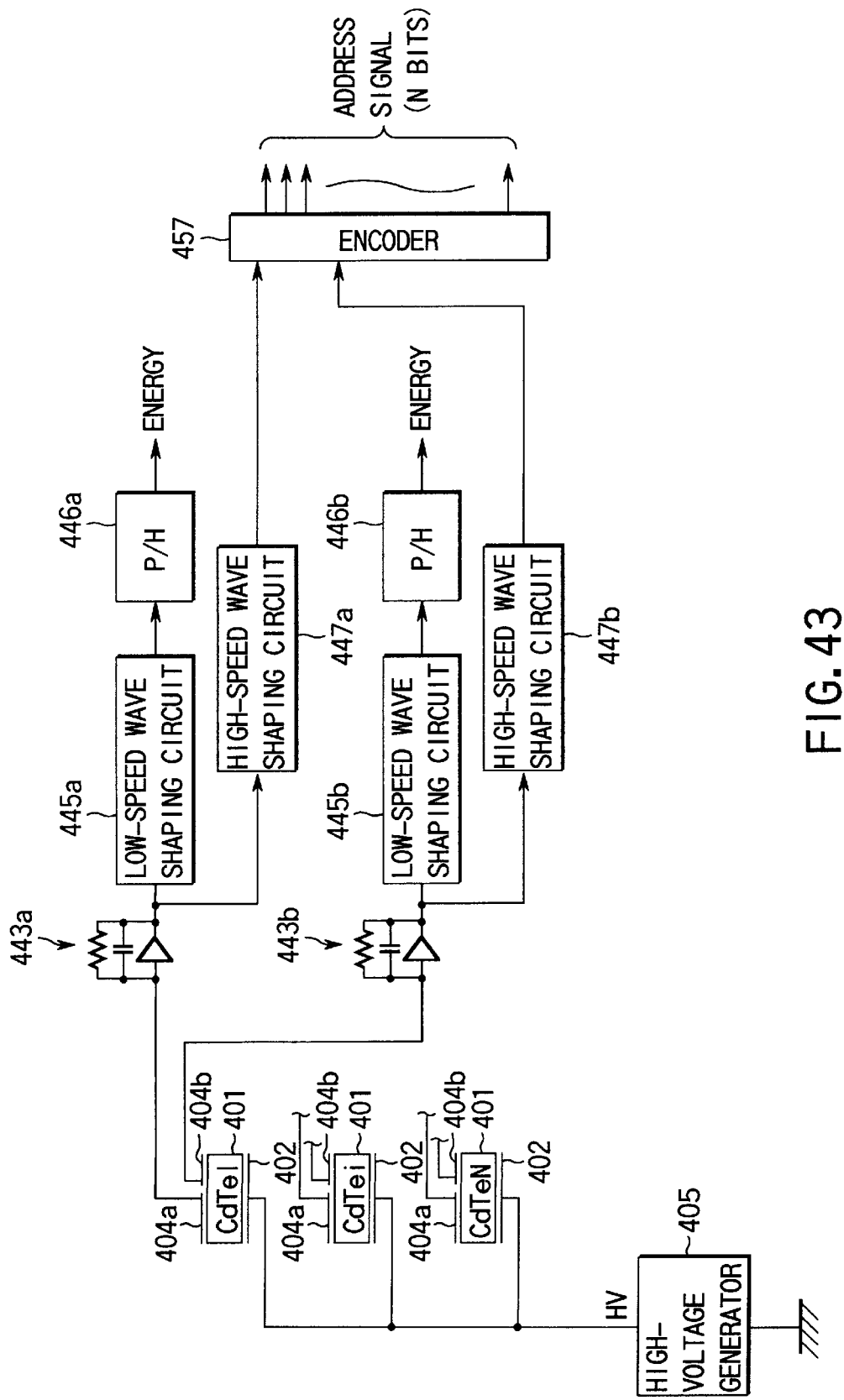
FIG. 43 is a block diagram showing the processing circuit in the fifth embodiment.

In the above description, the common electrode is divided into a plurality of common electrode elements. Alternatively, as shown in FIGS. 42A, 42B, and 42C, not the common electrode 402 but the signal electrode 404 is divided into two signal electrode elements 404a and 404b in the Z direction, i.e., the direction of depth. To individually process output signals from the signal electrode elements 404a and 404b, charge amplifiers 443a and 443b, low-speed wave shaping circuits 445a and 445b, peak hold circuits 446a and 446b, and high-speed wave shaping circuits 447a and 447b are respectively arranged for the signal electrode elements 404a and 404b, as shown in FIG. 43.

Even when the signal electrode is divided into a plurality of signal electrode elements, the gamma rays/charge conversion point (X,Y,Z) can be recognized in place of the incidence point (X,Y), unlike the conventional detector. An error between actual and recognition points becomes much smaller than in the conventional detector, and the spatial resolution and reliability of a reconstructed image can increase.

The point recognition precision can be increased by increasing the signal electrode division number. To prevent crosstalk between a plurality of electrode elements prepared by dividing the signal electrode, a groove may be formed in a cell between electrode elements and filled with an insulator, or an insulating layer may be formed by ion implantation. If the common electrode element is shared by semiconductor cells adjacent in the X direction, a semiconductor cell array can be easily mounted, and the semiconductor cell density can increase.

(Fifth Embodiment)

Figure 44:
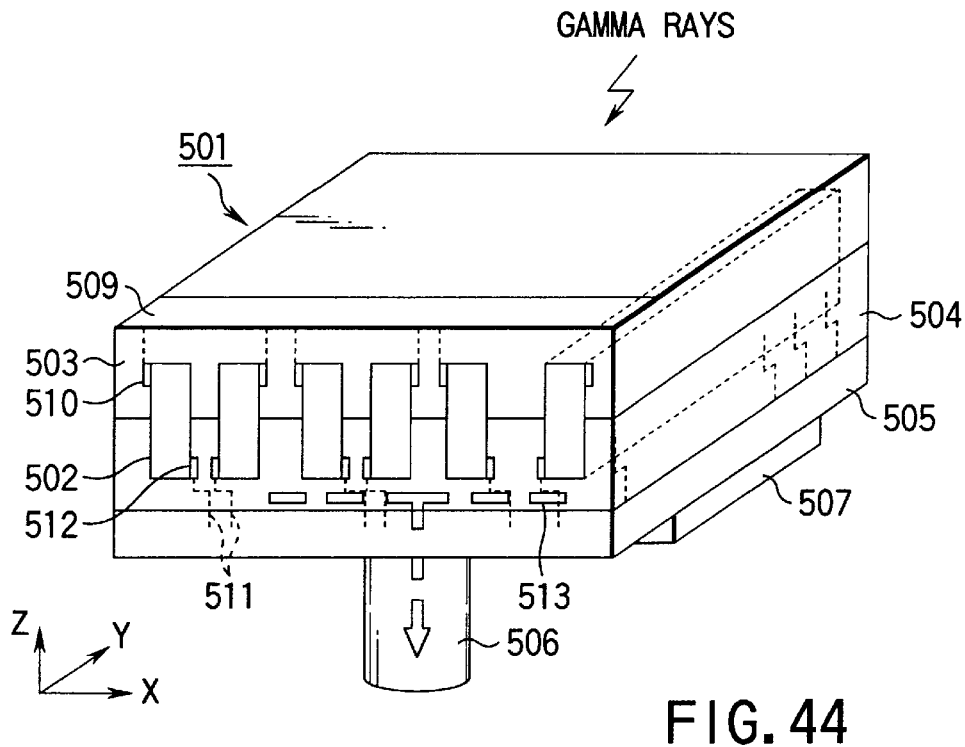
FIG. 44 is a perspective view showing the outer appearance of one module of a semiconductor gamma ray detector according to the sixth embodiment.
Figure 45:
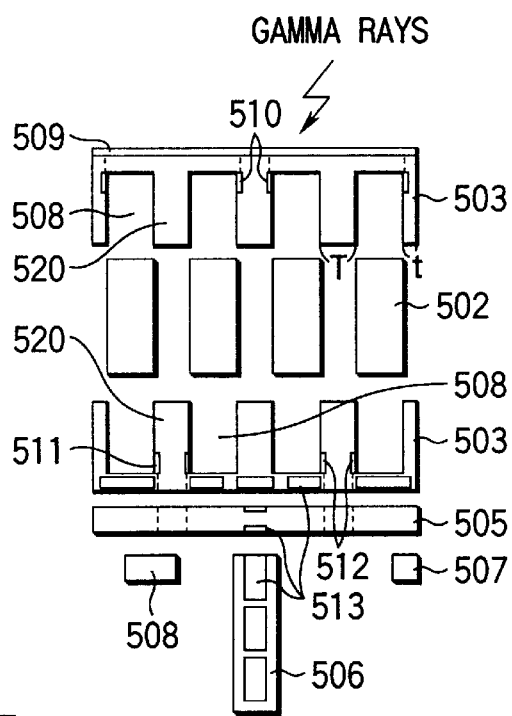
FIG. 45 is an exploded view showing one module in FIG. 44.

As shown in FIGS. 44 and 45, each of a plurality of modules 501 constituting a semiconductor gamma ray detector comprises a plurality of semiconductor cells 502, an upper case 503, a lower case 504, a signal line case 505, a support leg 506, a connector (output terminal) 507, an ASIC (Application Specific Integrated Circuit) 558, a voltage line 509, a common electrode 510, a signal electrode lead wire 511, a signal electrode 512, and a ground pattern 513.

A plurality of slits 508 for fitting the semiconductor cells 502 are formed in the upper and lower cases 503 and 504 in the Y direction. By fitting the semiconductor cells 502 in the slits 508, the semiconductor cells 502 can be arrayed with high precision.

The voltage line 509 is formed on a left partition 520 of each slit 508, and the common electrode 510 is formed on the surface of this partition 520. The lead wire 511 is formed on a right partition 520 of each slit 508, and the signal electrode 512 is formed on the surface of this partition 520. The ground pattern 513 is formed on the bottom in the slit 508.

The semiconductor cells 502 may be laid out parallel in the X direction as a one-dimensional array, or further parallel in the Y direction as a two-dimensional array. When the two-dimensional array is formed, a plurality of semiconductor cells 502 may be aligned in the Y direction, or the two electrodes or signal electrode of one semiconductor cell 502 may be divided into a plurality of elements at an appropriate equal interval in the Y direction so as to be electrically insulated from each other, thereby dividing the semiconductor cell.

In the example shown in FIGS. 44 and 45, a plurality of signal electrodes 512 are laid out parallel for one columnar semiconductor cell 502 to realize a two-dimensional array.

The common electrodes 510 of a given cell 502 and an adjacent cell 502 are formed on the same partition 520. Similarly, the signal electrodes 512 of a given cell 502 and an adjacent cell 502 are formed on the same partition 520. Since the signal electrode 512 is partitioned from the common electrode 510, the S/N ratio increases. Since no electrodes need be separated, the partition 520 can be made thin to reduce the dead zone.

The case is divided into the upper and lower cases 503 and 504 to facilitate mounting and decrease the mechanical stress on the semiconductor cell 502. The upper and lower cases 503 and 504 can be made by forming a heat-resistant insulating molding material having good gamma ray characteristics into a predetermined shape. The physical strength of the case is preferably enhanced by sandwiching an appropriate reinforcing material such as a metal thin film in the molding material.

A plurality of slits 508 each having a width and length corresponding to the width and length of the semiconductor cell 502 are formed in the upper and lower cases 503 and 504 at a predetermined equal interval. When the partition 520 of the slit 508 has a thickness 2•t, a sidewall 503 of the case 503 or 504 is adjusted to a half thickness t. The widths of dead zones can therefore be made uniform upon arraying a plurality of modules.

Since the partition 520 of the slit 508 is made thin, the interval between the semiconductor cells 502, i.e., the dead zone where no gamma ray can be detected can be reduced to a width which is equal or smaller than ⅛ the total width of the interval and the gamma ray incidence plane of one semiconductor cell 502, i.e. the width of the dead zone and the sensible zone, and is equal or smaller than 400 μm.

Electrical connection between the electrodes 510 and 512 of the cases 503 and 504 and the semiconductor cell 502 may be ensured by a conductive adhesive, or by heat shrinkage of the cases 503 and 504 after the cases 503 and 504 are heated to thermally expand and mount the cell 502. Alternatively, the electrodes 510 and 512 may have an elastic structure such a leaf spring, or may be mechanically brought into tight contact with an elastic structure such as a spring.

The common electrode 510 formed on the upper case 503 is electrically connected to one voltage line 509 laid inside the upper case 503 or on the gamma ray incidence plane. When a detector is constituted using a plurality of modules, if the voltage line 509 is laid on the gamma ray incidence plane and connected to a proper connector at the end, the voltage line 509 can be easily shared by all the modules.

The signal electrode 512 formed on the lower case 504 is electrically connected to an independent signal lead wire 511, and the signal lead wire 511 is guided from the lower case 504 to a signal processing circuit.

The signal line case 505 is mounted on the rear surface of the lower case 504 so as not to protrude from the rear surface of the lower case 504. Predetermined numbers of ASICs 508, connectors 507, and support legs 506 are mounted on the lower surface of the signal line case 505. A desired device such as an ADC (Analog-to-Digital Converter) or other components may be mounted.

All or some of these components can be integrally manufactured.

The ground pattern 513 is formed on the bottom inside the lower case 504 with a size as large as possible, thereby suppressing influence of noise on a very small semiconductor signal. The ground pattern 513 extends through the signal line case 505 to the lower end of the support leg 506.

If the support leg 506 is fixed to a metal plate such as a copper plate arranged below the module, the module can be aligned and supported, and the ground pattern 513 can be electrically connected to the metal plate. This connection ensures insulation and dissipates heat inside the module. In this module, the support leg 506 serves as an alignment means, support means, insulating means, and head dissipation means. The support leg 506 and metal plate can be connected by various general methods, e.g., screwing using a screw structure formed on the support leg 506, slide fixing, or fixing using a wedge function after the module is mounted.

The temperature can be managed with high precision by mounting a cooling fan on the metal plate to increase the heat dissipation efficiency, or mounting a water tube having a surface in contact with, e.g., a Peltier cooling semiconductor cell on the metal plate to constitute a circulating system. The metal plate is preferably sandwiched between the module and motherboard to ensure electrical isolation and shield the module from heat from the motherboard.

Figure 46:
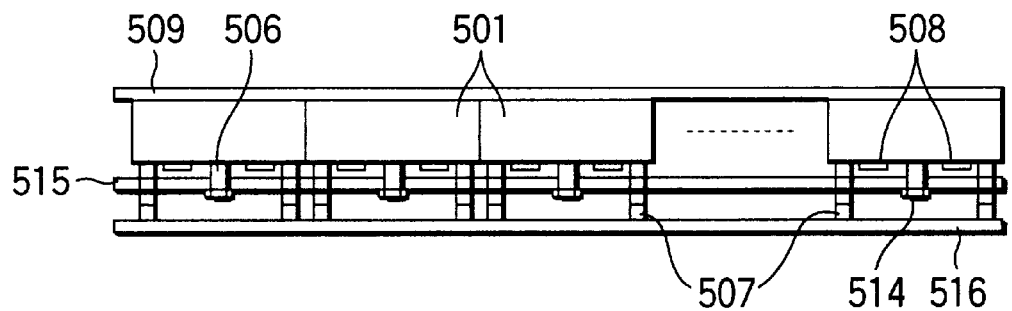
FIG. 46 is a front view showing the semiconductor gamma ray detector according to the sixth embodiment.
Figure 47:
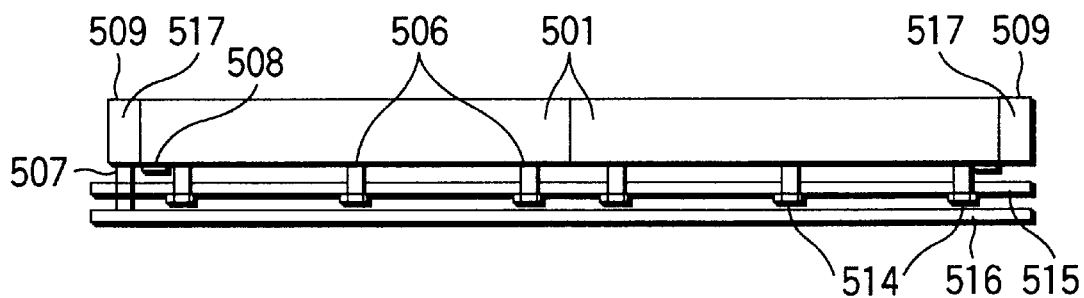
FIG. 47 is a front view showing another semiconductor gamma ray detector according to the sixth embodiment.

FIGS. 46 and 47 are sectional views each showing a semiconductor detector having a large field of view. Many modules 501 relatively small in size are fixed to a copper plate with fixing nuts 506 and 514 at a high density. The module array is mounted on a motherboard 516. A shield 517 made of, e.g., lead is attached around the module array. An operating voltage line 509 is formed on the gamma ray incidence plane of an upper case 2 and shared by the modules.

A signal generated by an incident gamma ray is sent from a signal electrode 512 to an ASIC 508 via a signal line 511, processed by the ASIC 508, and extracted to the motherboard 516 via a connector 507.

The detector in FIG. 46 is compared with the detector in FIG. 47 to find that the detector in FIG. 47 constituted by a smaller number of larger-size modules 501 requires smaller numbers of connectors 507, support legs 506, and the like, and has a simpler structure than in the detector in FIG. 46. At the same time, the detector in FIG. 47 ensures a larger circuit mounting space in the module 501 and motherboard 516, exhibits a better electrical isolation effect using the copper plate, and requires a smaller number of contact portions with the modules 501. Further, the blind zones as the distances between semiconductor cells can be more easily arranged with a uniform size. However, these are merely differences in design, and the size and number of modules to be used are determined in accordance with various conditions such as the manufacturing method and cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor radiation detector comprising:
   a plurality of semiconductor cells arrayed in a matrix parallel to an X-Y plane;
   a plurality of common electrodes for applying an operating voltage to said semiconductor cells, said common electrodes being arranged perpendicularly to the X-Y plane; and
   a plurality of signal electrodes for reading out signals from said semiconductor cells, said signal electrodes being arranged perpendicularly to the X-Y plane,
   wherein an interval between said semiconductor cells is equal or smaller than approximately 1/8 a total width of the interval and a sensible zone of each semiconductor cell.

2. A semiconductor radiation detector comprising:
   a plurality of semiconductor cells arrayed in a matrix parallel to an X-Y plane;
   a plurality of common electrodes for applying an operating voltage to said semiconductor cells, said common electrodes being arranged perpendicularly to the X-Y plane; and
   a plurality of signal electrodes for reading out signals from said semiconductor cells, said signal electrodes being arranged perpendicularly to the X-Y plane,
   wherein an interval between said semiconductor cells is equal or smaller than approximately 400 $\mu$m.

3. A semiconductor radiation detector comprising:
   a plurality of semiconductor cells arrayed in a matrix parallel to an X-Y plane;
   a plurality of common electrodes for applying an operating voltage to said semiconductor cells, said common electrodes being arranged perpendicularly to the X-Y plane, each common electrode being shared by a pair of semiconductor cells adjacent in an X direction; and
   a plurality of signal electrodes for reading out signals from said semiconductor cells, said signal electrodes being arranged perpendicularly to the X-Y plane, each signal electrode being shared by a pair of semiconductor cells adjacent in the X direction.

4. A detector according to claim 3, wherein each signal electrode is divided into a plurality of signal electrode elements arranged in a line extending in a Y direction so as to form a plurality of channels by each semiconductor cell.

5. A detector according to claim 4, wherein the plurality of signal electrode elements are electrically insulated from each other by an insulating layer.

6. A detector according to claim 5, wherein the plurality of signal electrode elements are insulated from each other by a groove formed in said semiconductor cell and extending in a Z direction.

7. A detector according to claim 3, further comprising:
a signal line board having signal lines for respectively reading out signals from said signal electrodes; and
an operating voltage line board having voltage lines for applying operating voltages to said common electrodes, said signal line board being mounted on a rear surface of the semiconductor cell array, said operating voltage line board being mounted on a front surface of the semiconductor cell array.

8. A detector according to claim 3, further comprising:
a signal line board having signal lines for respectively reading out signals from said signal electrodes; and
an operating voltage line board having voltage lines for applying operating voltages to said common electrodes, said signal line board being mounted on a rear surface of the semiconductor cell array, said operating voltage line board being mounted on a side surface of the semiconductor cell array.

9. A detector according to claim 3, further comprising:
a signal line board having signal lines for respectively reading out signals from said signal electrodes; and
an operating voltage line board having voltage lines for supplying operating voltages to said common electrodes, said signal line board and said operating voltage line board being arranged on a rear surface of said semiconductor cell array.

10. A detector according to claim 3, wherein said common electrodes alternately receive first and second operating voltages in the X direction to form one channel by each semiconductor cell.

11. A detector according to claim 10, further comprising:
charge amplifiers respectively arranged for said signal electrodes; and
a circuit for determining which of a pair of semiconductor cells sharing said signal electrode receives a ray on the basis of a difference between charge-up times of said charge amplifiers owing to a difference in application voltage.

12. A detector according to claim 10, wherein each common electrode periodically alternately receives the first and second operating voltages.

13. A detector according to claim 3, wherein said signal and common electrodes are adhered to said semiconductor cells with a conductive adhesive.

14. A detector according to claim 3, wherein said signal and common electrodes are formed from a beryllium copper plate.

15. A detector according to claim 3, wherein said common electrodes are coupled in a Y direction.

16. A detector according to claim 3, further comprising a support column for supporting the semiconductor cell array, said support column also serving as a heat pipe.

17. A detector according to claim 3, further comprising a collimator having scepters arranged at intervals between said semiconductor cells.

18. A semiconductor radiation detector comprising:
a plurality of semiconductor cells arrayed in a matrix parallel to an X-Y plane;
a plurality of common electrodes for applying an operating voltage to said semiconductor cells, said common electrodes being arranged perpendicularly to the X-Y plane; and
a plurality of signal electrodes for reading out signals from said semiconductor cells, said signal electrodes being arranged perpendicularly to the X-Y plane,
wherein said signal and common electrodes are alternately arranged at a plurality of intervals between semiconductor cells adjacent in an X direction, and said signal and common electrodes are shared by a pair of semiconductor cells adjacent in the X direction.

19. A semiconductor radiation detector comprising:
a plurality of semiconductor cells arrayed in a matrix parallel to an X-Y plane;
a plurality of common electrodes for applying an operating voltage to said semiconductor cells, said common electrodes being arranged perpendicularly to the X-Y plane, each common electrode being shared by a pair of semiconductor cells adjacent in an X direction; and
a plurality of signal electrodes for reading out signals from said semiconductor cells, said signal electrodes being arranged perpendicularly to the X-Y plane, said signal electrodes being respectively arranged for said semiconductor cells.

20. A detector according to claim 19, wherein pairs of said signal electrodes and said common electrodes are alternately arranged at a plurality of intervals between semiconductor cells adjacent in the X direction.

21. A detector according to claim 20, wherein said pairs of signal electrodes are insulated by an insulating layer.

22. A detector according to claim 20, wherein one signal line of a pair of signal electrodes and the other signal line of the pair of signal electrodes are bent in directions in which the signal lines are apart from each other.

23. A detector according to claim 20, wherein one signal line of a pair of signal electrodes and the other signal line of the pair of signal electrodes extend from different sides.

24. A detector according to claim 20, wherein a pair of signal electrodes are coupled by an insulating coupling member via an insulating layer.

25. A detector according to claim 19, wherein each signal electrode is divided into a plurality of signal electrode elements arranged in a line extending in a Y direction so as to form a plurality of channels by each semiconductor cell.

26. A semiconductor radiation detector comprising:
a plurality of semiconductor cells arrayed in a matrix parallel to an X-Y plane;
a plurality of common electrodes for applying an operating voltage to said semiconductor cells, said common electrodes being arranged perpendicularly to the X-Y plane, each common electrode being divided into a plurality of common electrode elements in a Z direction so as to form a plurality of channels by each semiconductor cell in the Z direction; and
a plurality of signal electrodes for reading out signals from said semiconductor cells, said signal electrodes being arranged perpendicularly to the X-Y plane.

27. A detector according to claim 26, wherein the plurality of common electrode elements receive different operating voltages.

28. A detector according to claim 26, further comprising:
charge amplifiers respectively arranged for said signal electrodes; and
a circuit for determining which of the plurality of channels receives a ray on the basis of a difference between charge-up times of said charge amplifiers owing to a difference in application voltage.

29. A semiconductor radiation detector comprising:
a plurality of semiconductor cells arrayed in a matrix parallel to an X-Y plane;

a plurality of common electrodes for applying an operating voltage to said semiconductor cells, said common electrodes being arranged perpendicularly to the X-Y plane; and a plurality of signal electrodes for reading out signals from said semiconductor cells, said signal electrodes being arranged perpendicularly to the X-Y plane, each signal electrode being divided into a plurality of signal electrode elements in a Z direction so as to form a plurality of channels by each semiconductor cell in the Z direction.

30. A semiconductor radiation detector comprising:

a plurality of semiconductor cells arrayed in a matrix parallel to an X-Y plane;

a plurality of common electrodes for applying an operating voltage to said semiconductor cells, said common electrodes being arranged perpendicularly to the X-Y plane;

a plurality of signal electrodes for reading out signals from said semiconductor cells, said signal electrodes being arranged perpendicularly to the X-Y plane; and a case for storing said semiconductor cells, said case having a plurality of slits which are formed inside said case to fit said semiconductor cells.

31. A detector according to claim 30, wherein a sidewall of said case has a thickness which is substantially ½ a thickness of a partition of the slit.

32. A detector according to claim 30, wherein a partition of the slit has a thickness equal or smaller than approximately ⅛ a total thickness of the partition and said semiconductor cell.

33. A detector according to claim 30, wherein a partition of the slit has a thickness equal or smaller than approximately 400 µm.

34. A detector according to claim 30, wherein said common and signal electrodes are formed on an inner wall of the slit.

35. A detector according to claim 34, wherein said common electrode is arranged in a ray incidence side, and said signal electrode is arranged in a side opposite to the ray incidence side.

36. A detector according to claim 34, wherein said common electrode has a leaf spring structure and is electrically connected to said semiconductor cell by a spring force, and said signal electrode has a leaf spring structure and is electrically connected to said semiconductor cell by a spring force.

37. A detector according to claim 34, wherein said common electrode is electrically connected to said semiconductor cell with a conductive adhesive, and said signal electrode is electrically connected to said semiconductor cell with a conductive adhesive.

38. A detector according to claim 34, wherein said semiconductor cell is electrically connected to said common electrode by thermal expansion and heat shrinkage of said case, and said semiconductor cell is electrically connected to said signal electrode by thermal expansion and heat shrinkage of said case.

39. A detector according to claim 38, wherein said semiconductor cell is mechanically held with said common electrode, and said semiconductor cell is mechanically held with said signal electrode.

40. A detector according to claim 30, wherein an electrical ground surface is formed on a bottom in the slit.

41. A detector according to claim 30, wherein said case is divided into upper and lower cases.

42. A detector according to claim 30, wherein said semiconductor cells are formed into a columnar shape, and a plurality of signal electrodes aligned in a Y direction are electrically connected to said semiconductor cells.

* * * * *